(12) United States Patent
Vangala et al.

(10) Patent No.: US 12,443,669 B2
(45) Date of Patent: Oct. 14, 2025

(54) ARTIFICIAL INTELLIGENCE DRIVEN PERSONALIZATION FOR CONTENT AUTHORING APPLICATIONS

(71) Applicant: Microsoft Technology Licensing, LLC, Redmond, WA (US)

(72) Inventors: Vipindeep Vangala, Hyderabad (IN); Rajesh Gunda, Hyderabad (IN); Rashi Anand, Hyderabad (IN); Nishchay Kumar, Hyderabad (IN); Sapna Grover, Hyderabad (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/771,454

(22) Filed: Jul. 12, 2024

(65) Prior Publication Data

US 2024/0362285 A1 Oct. 31, 2024

Related U.S. Application Data

(63) Continuation of application No. 17/145,554, filed on Jan. 11, 2021, now Pat. No. 12,050,656.

(51) Int. Cl.
*G06F 16/00* (2019.01)
*G06F 3/0481* (2022.01)
(Continued)

(52) U.S. Cl.
CPC ........ *G06F 16/9535* (2019.01); *G06F 3/0481* (2013.01); *G06F 40/279* (2020.01); *G06F 40/30* (2020.01); *G06N 20/00* (2019.01)

(58) Field of Classification Search
CPC .... G06F 40/279; G06F 40/30; G06F 16/9535; G06F 3/0481; G06Q 10/107; G06N 20/00
See application file for complete search history.

(56) References Cited

U.S. PATENT DOCUMENTS

| 10,462,215 B2 | 10/2019 | Gill et al. |
| 2005/0262081 A1 | 11/2005 | Newman |

(Continued)

OTHER PUBLICATIONS

Radford, et al., "Better Language Models and Their Implications", Retrieved from: https://web.archive.org/web/20201209195559/https:/openai.com/blog/better-language-models/, Dec. 9, 2020, 12 Pages.
(Continued)

*Primary Examiner* — Yicun Wu
(74) *Attorney, Agent, or Firm* — Calfee, Halter & Griswold LLP

(57) ABSTRACT

A computing system obtain a keyword and an identifier for a user of a content authoring application. Based upon the keyword and identifier for the user, the computing system walks a user graph comprising nodes connected by edges. The walk comprises identifying seed nodes in the user graph representing at least one topic that corresponds to the keyword and identifying second level nodes in the user graph that are connected to the seed nodes. The second level nodes represent first content that is associated with the user. The computing system transmits contextual data that is based upon the first content to the content authoring application. The contextual data is processed and formatted and is included in second content presentable by the content authoring application. The contextual data may be used to autogenerate the second content without user input. The second content may be modified by the user as desired.

20 Claims, 12 Drawing Sheets

(51) Int. Cl.
　　　*G06F 16/9535*　　(2019.01)
　　　*G06F 40/279*　　(2020.01)
　　　*G06F 40/30*　　(2020.01)
　　　*G06N 20/00*　　(2019.01)

(56) References Cited

U.S. PATENT DOCUMENTS

| | | |
|---|---|---|
| 2016/0092416 A1 | 3/2016 | Kohlmeier et al. |
| 2016/0294761 A1 | 10/2016 | Hameed et al. |
| 2017/0161279 A1 | 6/2017 | Franceschini et al. |
| 2018/0114111 A1 | 4/2018 | Gill et al. |

OTHER PUBLICATIONS

Wright, Mic, "Haiku Deck's new AI tool can automatically generate your next presentation", Retrieved from: https://thenextweb.com/apps/2015/03/05/haiku-decks-new-ai-tool-can-automatically-generate-your-next-presentation/, Mar. 5, 2015, 6 Pages.

"International Search Report and Written Opinion Received for PCT Application No. PCT/US21/061048", Mailed Date: Mar. 18, 2022, 11 Pages.

"Non-Final Office Action Issued in U.S. Appl. No. 17/145,554", Mailed Date: Nov. 7, 2022, 28 Pages.

"Final Office Action Issued in U.S. Appl. No. 17/145,554", Mailed Date: Aug. 17, 2023, 16 Pages.

"Response to Non-Final Office Action Issued in U.S. Appl. No. 17/145,554", filed May 8, 2023, 11 Pages.

"Notice of Appeal Filed in U.S. Appl. No. 17/145,554", filed Jan. 17, 2024, 2 Pages.

"Notice of Allowance Issued in U.S. Appl. No. 17/145,554", Mailed Date: Mar. 27, 2024, 16 Pages.

Summons to attend oral proceedings pursuant to Rule 115(1) EPC Received for European Application No. 21840728.6, mailed on Jul. 8, 2025, 11 pages.

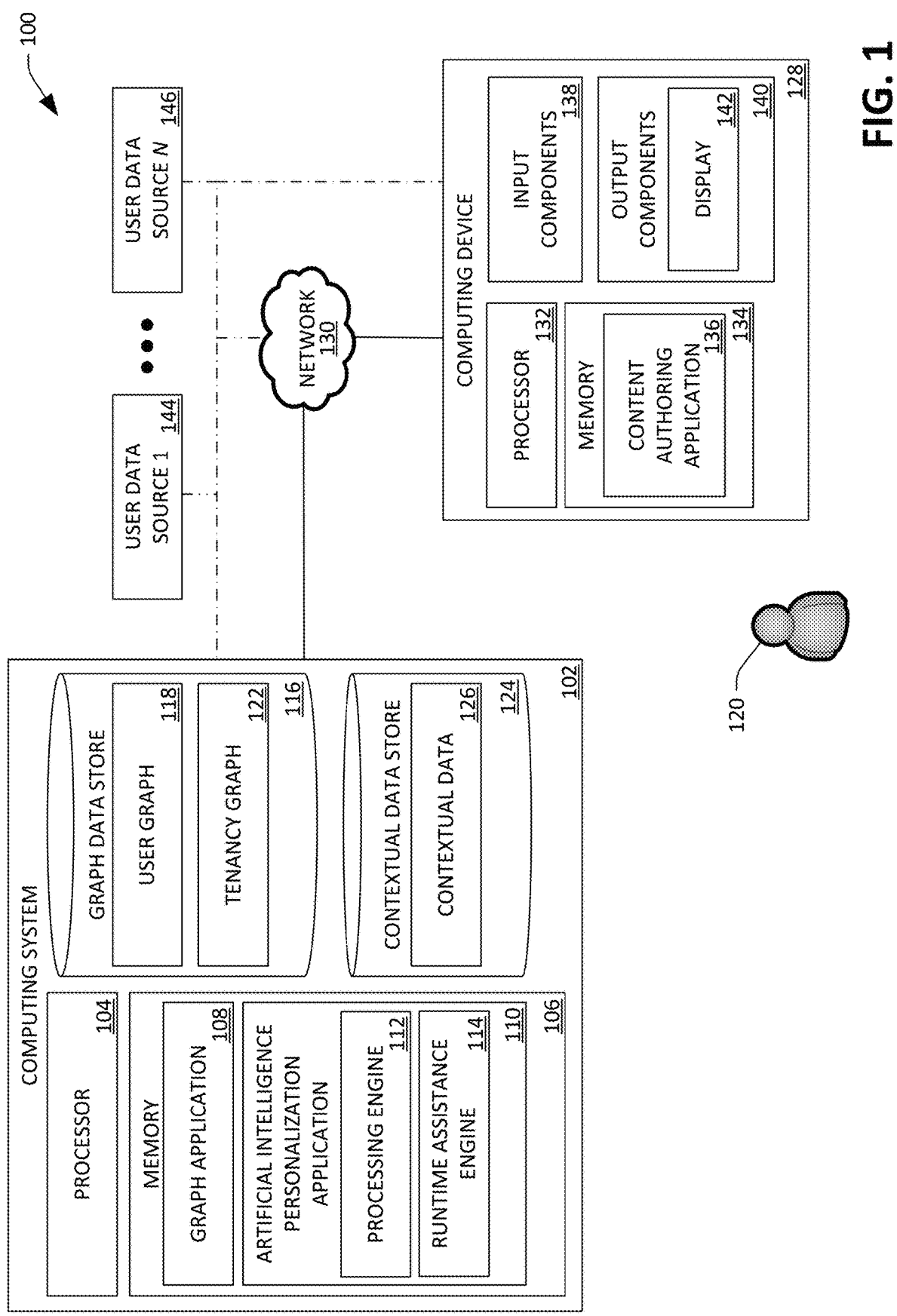

FIG. 5E

ARTIFICIAL INTELLIGENCE DRIVEN PERSONALIZATION FOR CONTENT AUTHORING APPLICATIONS

CROSS REFERENCE TO RELATED APPLICATIONS

This application is a continuation of U.S. patent application Ser. No. 17/145,554 filed on Jan. 11, 2021. All sections of the aforementioned application are incorporated herein by reference in their entirety.

BACKGROUND

A content authoring application enables a user to create different types of content suitable for different purposes. In an example, a content authoring application may be or include a slideshow application, a word processing application, a spreadsheet application, an email application, or a real-time messaging application. In an example, content generated by a content authoring application may be or include a slideshow presentation, a document (e.g., a word processing document, a portal document format (PDF) document, etc.), a spreadsheet, an email, or a real-time message.

Content generated by a content authoring application may require a user to obtain information from many different sources. For instance, if a slideshow presentation for a project is to be generated through use of a slideshow application, a user may need to obtain a list of contributors to the project from an email, test results for the project from a spreadsheet, technical details for the project from a document, and so forth. This typically requires that a computing device operated by the user receive manual input in order for the computing device to search for and include the information in the slideshow presentation. For instance, following the slideshow presentation example above, the computing device operated by the user receives input via an email application to search for the email that includes the list of contributors and receives input via a file searching system to search for the spreadsheet and the document. Once the information is located, the computing device typically receives input corresponding to copy and paste operations in order for the computing device to insert the information into the slideshow presentation. Processing search queries over many different sources is burdensome on resources of the computing device. Furthermore, searching different sources for pertinent information and manually copying and pasting the information into the slideshow presentation is a frustrating and time-consuming experience for the user.

While artificial intelligence (AI) driven summarization exists for certain content authoring applications and may aid a user in including information in content generated by content authoring applications, such technology is limited. For instance, conventional AI driven summarization tends to be limited to extracting string-based summaries of information. Furthermore, conventional AI driven summarization tends to be limited to content that has been accessed recently, which is not useful when the user requires summarization of content that has not been accessed recently.

SUMMARY

The following is a brief summary of subject matter that is described in greater detail herein. This summary is not intended to be limiting as to the scope of the claims.

Disclosed herein are various technologies pertaining to artificial intelligence (AI) driven personalization of content generated by a content authoring application. With more specificity, an AI personalization application is disclosed herein that is configured to identify contextual data for a user based upon a keyword and an identifier for the user. The contextual data is generated based upon walking and processing a computer-implemented user graph for the user. The AI personalization application causes the contextual data to be included in content that is presentable by the content authoring application.

For example, if a user opts-in, a graph application obtains (i.e., receives or generates) user activity data of a user from a plurality of applications and generates and maintains a user graph for the user based upon the user activity data. The user activity data may include historical activity data of the user and/or real-time data of the user collected via a plugin or interop communication. The user graph includes nodes and edges connecting the nodes. Each node represents an entity, where the entity may be a user, a topic, content (e.g., an email, a slideshow presentation, etc.) that has been associated with (e.g., created by, edited by, accessed by, able to be accessed by, and/or viewed by) the user, or a tenancy of the user (e.g., a group or an organization to which the user belongs). Each edge is assigned criteria that is indicative of a relationship between entities represented by nodes that are connected by a respective edge. In an example, when an email application transmits an email authored by the user to a contact of the user, the graph application identifies at least one seed node in the user graph representing a topic that has been assigned to the email (or a subtopic of the email, or a related topic to the topic of the email, or a name of a person referenced in the email, or the like). In the example, the graph application generates a second level node representing the email. The second level node may include metadata for the email. The graph application also generates a first edge that connects the seed node(s) to the second level node, where the first edge is assigned criteria that indicates that the email belongs to the topic. Following the example, the graph application may also identify a third level node in the user graph representing the contact of the user. The graph application also generates a second edge and connects the second level node to the third level node via the second edge. In this example, the second edge is assigned second criteria indicating that the email was sent by the user to the contact of the user.

In some embodiments, the graph application also generates and maintains a tenancy graph for a tenancy to which the user belongs (e.g., a group, a team, or an organization). The tenancy graph is similar to the user graph, that is, the tenancy graph has nodes representing entities and edges connecting the nodes. Each edge is assigned criteria that is indicative of a relationship between entities represented by nodes that are connected by a respective edge. However, unlike the user graph, nodes representing content in the tenancy graph represent content that is associated with the tenancy and that is accessible to the user, but that may or may not have been previously accessed by the user. For this reason, the tenancy graph may include nodes and edges (e.g., representing topics) that are not represented in the user graph and vice versa.

A content authoring application receives an indication that the user desires content to be generated for a topic; for instance, the content authoring application can receive one or more keywords from a user (e.g., a query, a title, or a topic sentence), and the AI personalization application can obtain (i.e., generate or receive) the keyword(s) and an identifier for the user and identify the topic based upon the keyword(s). The AI personalization application, upon identifying the topic, walks the user graph (identified from amongst a plurality of graphs through use of the identifier for the user) based on the topic in order to identify a subgraph for the topic in the user graph. With more specificity, the AI personalization application identifies at least one node in the user graph that represents the topic (i.e., at least one seed node). The AI personalization application then traverses edges that connect the seed node(s) to reach second level nodes in the user graph ("a first level of expansion"). For each second level node (or for selected second level nodes of a given type), the AI personalization application may traverse edges connecting the second level nodes to third level nodes ("a second level of expansion"). This process may continue until the AI personalization application reaches a threshold level of expansion (e.g., three levels of expansion), whereupon the subgraph identification is completed. In an example where the threshold level of expansion is two and the topic is "Project 1", the AI personalization application may identify a seed node representing Project 1. In the example, as a first level of expansion, the AI personalization application may identify nodes representing emails (i.e., second level nodes) related to Project 1 by traversing edges in the user graph that connect the seed node to the second level nodes. Following the example, as a second level of expansion, the AI personalization application may identify nodes representing contacts of the user identified in the emails (i.e., third level nodes) by traversing edges in the user graph that connect the second level nodes to the third level nodes. In some embodiments, the AI personalization application performs a walk of one or more tenancy graphs of the user based on the topic in order to identify one or more additional subgraphs for the topic.

The AI personalization application may perform processing on nodes of the subgraph. With more specificity, for each node in the subgraph, the AI personalization application may perform context identification, identification of entities referenced in content, structured data processing, unstructured data processing, natural language processing (NLP), and template processing. The processing may include applying a variety of AI models and algorithms to content represented by the nodes in the subgraph. In some embodiments, the AI personalization application ranks the nodes of the subgraph using a ranking algorithm that is configured to rank content (e.g., documents) based upon suitable factors, including but not limited to a number of times that the content has been accessed, a number of references in the content to other content, a number of references to the content in the other content, manually set forth relevance scores, etc. In some embodiments, the AI personalization application performs processing on nodes that are ranked above a threshold level. Contextual data is generated and/or identified based upon the processing of the nodes. For example, contextual data for a node that represents content may include the content itself, an extracted portion of the content, and/or data that is derived from the content (e.g., a summarization of the content). The AI personalization application may store the contextual data in a contextual data store. In some embodiments, the AI personalization application also performs processing on nodes of the one or more additional subgraphs for the topic to generate and/or identify second contextual data. In some embodiments, the AI personalization application aggregates and stores the second contextual data in the contextual data store with the contextual data.

As indicated previously, the content authoring application is being utilized by the user in order to generate content. In an example, the content authoring application may be a slideshow application and the content may be a slideshow presentation. The content authoring application transmits one or more keywords and an identifier for the user to the AI personalization application. In the example, the keyword may be from a title of the slideshow presentation. The AI personalization application identifies the topic based upon the keyword(s), walks the user graph from a node therein that represents the topic to identify the subgraph, and identifies the contextual data for the user (which may be stored in the contextual data store), where the contextual data corresponds to content represented by nodes in the subgraph. The AI personalization application transmits the contextual data to the content authoring application, whereupon the content authoring application includes the contextual data in the content that is presentable by the content authoring application. In an example where the content authoring application is a slideshow application and the content is a slideshow, the contextual data included in the slideshow may be a table extracted from a user data source, a summarization of an email sent by the user, a definition of an acronym defined in content of the user, a slide from a related slideshow presentation, and the like. The content authoring application may display the contextual data included in the content within the slideshow application on a display in order for the user to view and optionally edit the contextual data. For instance, the content authoring application may display thumbnails of slides of the slideshow presentation, where the slides include the contextual data. Upon receiving a selection of a thumbnail in the thumbnails, the content authoring application may display a slide corresponding to the thumbnail, where the slide includes the contextual data. In some embodiments, the AI personalization application also identifies the second contextual data in the contextual data store and causes at least a portion of the second contextual data to be included in the displayed content.

In some embodiments, the AI personalization application identifies first candidate contextual data and second candidate contextual data based upon the keyword(s) and the identifier for the user. The AI personalization application may then rank the first candidate contextual data and the second candidate contextual data based upon user data for the user. The AI personalization application transmits an identifier for the first candidate contextual data and an identifier for the second candidate contextual data to the content authoring application, whereupon the content authoring application presents the identifier for the first candidate contextual data and the identifier for the second candidate contextual data on a display in an order determined by the ranking. In an example, the content authoring application receives a selection of the identifier for the first candidate contextual data as input from the user. The content authoring application transmits an indication of the selection of the first candidate contextual data to the AI personalization application. Upon receiving the indication, the AI personalization application transmits the first candidate contextual data to the content authoring application, whereupon the content authoring application includes the first candidate contextual data in the content. The AI personalization application may also utilize the indication as feedback to update AI models and algorithms used in the processing that generates and/or identifies the contextual data.

In some embodiments, upon receiving the keyword, the AI personalization application can cause the content to be generated (using the contextual data) without receiving input from the user. For instance, in an example, the AI personalization application can utilize the contextual data generate to automatically generate slides of a slideshow presentation, where the slides include the contextual data.

The above-described technologies present various technical advantages over conventional technologies pertaining to AI generated summarization and content generation assistance. Unlike conventional technologies, the AI personalization application described above is not limited to extracting string-based summaries and instead is able to apply AI to a user graph in order to personalize content generated by content authoring applications. Furthermore, the AI personalization application reduces the burden on a computing device operated by the user, as the computing device does not need to perform multiple searches for different information across multiple databases and applications, nor does the computing device need to receive extensive input associated with copy and paste operations.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 1 is a functional block diagram of an example computing environment that facilitates artificial intelligence (AI) driven personalization for content generated by content authoring applications.

FIGS. 5A-E depict different views of an example graphical user interface (GUI) of a slideshow application that communicates with an AI personalization application.

DETAILED DESCRIPTION

Figure 3:
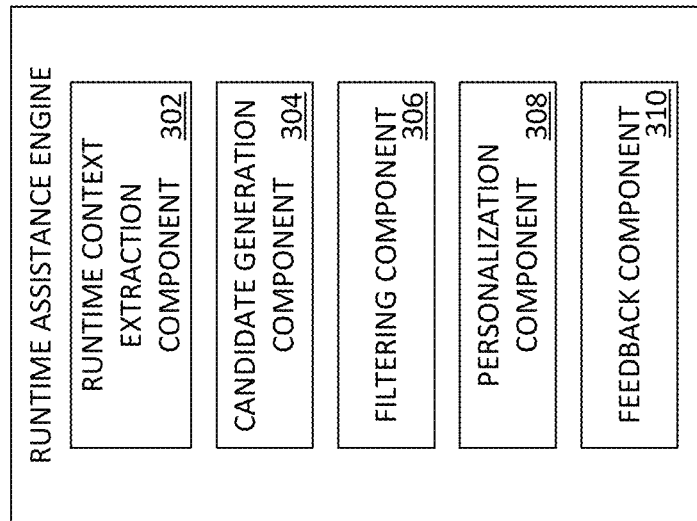
FIG. 3 is a functional block diagram of an example runtime assistance engine of an AI personalization application.

Various technologies pertaining to (AI) driven personalization of content generated by a content authoring application are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

In operation, after a user has opted-in, a graph application obtains (i.e., receives or generates) user activity data of a user from a plurality of applications and generates and maintains a user graph for the user based upon the user activity data. The user activity data may include historical activity data of the user and/or real-time data of the user collected via a plugin or interop communication. The user graph for the user includes nodes and edges connecting the nodes. Each node represents an entity, where the entity may be the user, a topic, content (e.g., a spreadsheet, a document, etc.) that has been associated with (i.e., created by, edited by, accessed by, able to be accessed by, and/or viewed by) the user, or a tenancy of the user (e.g., a group or an organization to which the user belongs). Each edge is assigned criteria that is indicative of a relationship between entities represented by nodes that are connected by a respective edge. In an example, when a slideshow application is used by the user to create a slideshow presentation, the graph application identifies at least one seed node in the user graph representing at least one topic to which the slideshow presentation belongs. The graph application then generates a second level node representing the slideshow presentation. The second level node may include metadata for the slideshow presentation (e.g., an identifier for the slideshow presentation, an identifier for a user data source in which the slideshow presentation is stored, a time of creation of the slideshow presentation, etc.). The graph application also generates an edge and connects the seed node(s) to the second level node via at least one edge. In this example, the at least one edge is assigned criteria that indicates that the slideshow presentation belongs to the topic.

In some embodiments, the graph application also generates and maintains a tenancy graph for a tenancy to which the user belongs (e.g., a group, a team, or an organization). The tenancy graph is similar to the user graph. For instance, the tenancy graph includes nodes representing entities and edges connecting the nodes. Each edge is assigned criteria that is indicative of a relationship between entities represented by nodes that are connected by a respective edge. However, unlike the user graph, nodes representing content in the tenancy graph represent content that is associated with the tenancy and that is accessible to the user, but that may or may not have been previously accessed by the user. For this reason, the tenancy graph may include nodes and edges (e.g., representing topics) that are not represented in the user graph and vice versa.

A content authoring application receives an indication that the user desires content to be generated for a topic; for instance, the content authoring application can receive at least one keyword from the user (e.g., a query, a title, or a topic sentence), and the AI personalization application can obtain (i.e., receive or generate) the keyword(s) and an identifier for the user and identify the topic based upon the keyword(s). The AI personalization application, upon identifying the topic, performs a walk of the user graph (identified from amongst a plurality of graphs through use of the identifier for the user) based on the topic in order to identify a subgraph for the topic in the user graph. With more specificity, the AI personalization application identifies at least one node assigned to a topic (i.e., at least one seed node). The AI personalization application then traverses edges that connect the seed node(s) to reach at least one second level node in the user graph ("a first level of expansion"). For each second level node, the AI personalization application may traverse edges connecting the second level node(s) to at least one third level node ("a second level of expansion"). This process may continue until the AI personalization application reaches a threshold level of expansion (e.g., three levels of expansion), whereupon the subgraph identification is completed. In an example where the threshold level of expansion is two and the topic is "Team Meeting 1", the AI personalization application may identify a seed node representing Team Meeting 1. As a first level of expansion, the AI personalization application may identify nodes representing contacts of the user (i.e., second level nodes) that participated in Team Meeting 1 by traversing edges in the user graph that connect the seed node to the second level nodes. As a second level of expansion, the AI personalization application may identify nodes representing documents (i.e., third level nodes) authored by the contacts of the user related to Team Meeting 1 by traversing edges of the user graph that connect the second level nodes to the third level nodes. In some embodiments, similar to the walk of the user graph, the AI personalization application walks one or more tenancy graphs of the user based on the topic in order to identify one or more additional subgraphs for the topic.

The AI personalization application may perform processing on nodes of the subgraph. With more specificity, for each node (or for selected node types) in the subgraph, the AI personalization application may perform context identification of content, identification of entities referenced in the content, structured data processing, unstructured data processing, natural language processing (NLP), and template processing. The processing may be based upon criteria assigned to edges connecting the nodes of the subgraph. The processing may include applying a variety of AI models and algorithms to entities (e.g., content) represented by the nodes in the subgraph. In some embodiments, the AI personalization application ranks the nodes of the subgraph using a ranking algorithm that is configured to rank content (e.g., documents) based upon suitable factors, including but not limited to a number of times that the content has been accessed, a number of references in the content to other content, a number of references to the content in the other content, manually set forth relevance scores, etc. In some embodiments, the AI personalization application performs processing on nodes that are ranked above a threshold level. Contextual data is generated and/or identified based upon the processing of the nodes, where the contextual data is associated with the user. The contextual data may include the content itself, a portion of the content, and/or data that is derived from the content (e.g., a summarization of the content). The contextual data may be stored in a contextual data store. In some embodiments, the AI personalization application also performs processing on nodes of the one or more additional subgraphs (of tenancy graphs) to generate and/or identify second contextual data. In some embodiments, the AI personalization application aggregates and stores the second contextual data in the contextual data store with the contextual data.

As indicated previously, the content authoring application is being utilized by the user to generate content. In an example, the content authoring application may be an email application and the content may be an email. The content authoring application transmits one or more keywords and an identifier for the user to the AI personalization application. In the example, the keyword may be a title of the email that is received as input by the email application. The AI personalization application identifies the topic based upon the keyword(s), walks the user graph from a node therein that represents the topic to identify the subgraph, and identifies the contextual data for the user (which may be stored in the contextual data store), where the contextual data corresponds to content represented by nodes in the subgraph. The AI personalization application transmits the contextual data to the content authoring application, where the content authoring application includes the contextual data in the content that is presentable by the content authoring application. Following the example where the content authoring application is an email application and the content is an email, the contextual data included in the email may be a table extracted from a spreadsheet of the user, a summarization of a document of the user, etc.

In some embodiments, the AI personalization application identifies first candidate contextual data, second candidate contextual data, and third candidate contextual data based upon the keyword(s) and the identifier for the user. The AI personalization application ranks the first candidate contextual data, the second candidate contextual data, and the third candidate contextual data based upon user data for the user (e.g., the user activity data). The AI personalization application transmits an identifier for the first candidate contextual data, an identifier for the second candidate contextual data, and an identifier for the third candidate contextual data to the content authoring application, whereupon the content authoring application presents the identifier for the first candidate contextual data, the identifier for the second candidate contextual data, and the identifier for the third candidate contextual data on a display in an order determined by the ranking. In an example, the content authoring application receives a selection of the identifier for the second candidate contextual data as input from the user. Upon receiving the selection, the content authoring application transmits an indication of the selection of the second candidate contextual data to the AI personalization application. Upon receiving the indication, the AI personalization application transmits the second candidate contextual data to the content authoring application, whereupon the content authoring application includes the second candidate contextual data in the content. The AI personalization application may also utilize the indication as feedback to update the AI models and algorithms used in the processing that generates contextual data.

In some embodiments, upon receiving the keyword, the AI personalization application can cause the content to be generated (using the contextual data) without receiving input from the user. For instance, in an example, the AI personalization application can utilize the contextual data generate to automatically generate slides of a slideshow presentation, where the slides include the contextual data.

The above-described technologies present various technical advantages over conventional technologies pertaining to AI generated summarization and content generation assistance. Unlike conventional technologies, the AI personalization application described above is not limited to extracting string-based summaries and instead is able to apply AI to a user graph in order to personalize content generated by content authoring applications. Furthermore, the AI personalization application reduces the burden on a computing device operated by the user, as the computing device does not need to perform multiple searches for different information across multiple databases and applications, nor does the computing device need to receive extensive input associated with copy and paste operations.

With reference to FIG. 1, an example computing environment 100 that facilitates AI driven personalization of content generated by content authoring applications is illustrated. The computing environment 100 includes a computing system 102. In some embodiments, the computing system 102 may be or include a cloud computing service. The computing system 102 includes a processor 104 and memory 106. The memory 106 has a graph application 108 and an AI personalization application 110 loaded therein. As will be described in greater detail below, the graph application 108, when executed by the processor 104, is configured to obtain (e.g., receive or generate) user activity data from a plurality of applications and to generate and maintain user graphs for the users based upon the user activity data. The user activity data may include historical activity data and/or real-time data collected via a plugin or interop communication. In some embodiments, the graph application 108 is also configured to generate tenancy graphs.

The AI personalization application 110, when executed by the processor 104, is configured to generate/identify contextual data for users based upon walks (and processing) of user graphs for the users (and optionally tenancy graphs) and to incorporate the contextual data into content generated by (and presented by) content authoring applications. The AI personalization application 110 includes a processing engine 112 and a runtime assistance engine 114.

Figure 2:
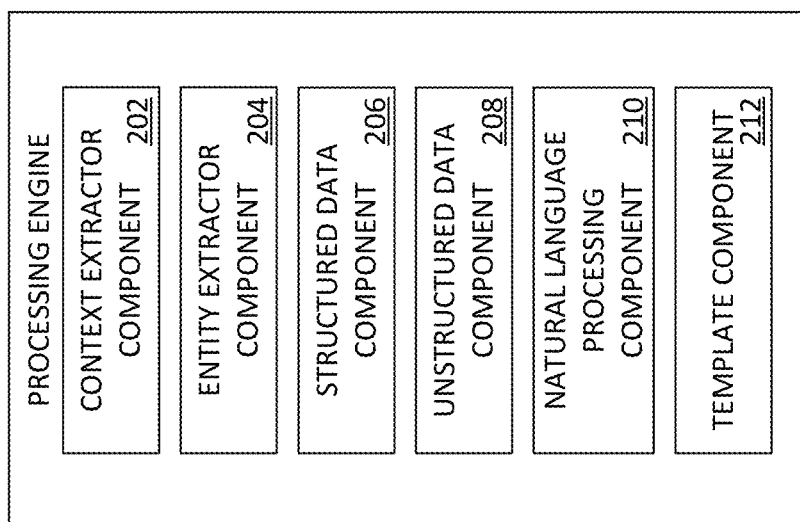
FIG. 2 is a functional block diagram of an example processing engine of an AI personalization application.

Turning briefly now to FIG. 2, a functional block diagram of the processing engine 112 is illustrated. In general, the processing engine 112 is configured to perform walks of user graphs (and optionally tenancy graphs) in order to identify entities that are relevant to users. The processing engine 112 is also configured to perform processing on the entities (e.g., content) represented in the user graphs (and optionally the tenancy graphs) in order to identify and/or derive contextual data from the entities. The processing engine 112 includes a context extractor component 202, an entity extractor component 204, a structured data component 206, an unstructured data component 208, a natural language processing (NLP) component 210, and a template component 212 (collectively referred to herein as "the processing engine components 202-212"). The context extractor component 202 is configured to extract contexts from content represented in user graphs and/or tenancy graphs. The entity extractor component 204 is configured to extract entities from the content represented in the user graphs and/or the tenancy graphs. For instance, the entity extractor component 204 may identify different entities referenced in a document, different users referenced in the document, and so forth. The structured data component 206 is configured to identify and extract structured data included in the content represented in the user graphs and/or the tenancy graphs. The unstructured data component 208 is configured to identify and extract unstructured data included in the content represented in the user graphs and/or the tenancy graphs. The NLP component 210 is configured to perform NLP (via an NLP algorithm) on text found in content represented in the user graphs and/or the tenancy graphs. For instance, the NLP component 210 may generate summaries of documents represented in the user graphs and/or tenancy graphs. The template component 212 is configured to extract information from content represented in the user graphs and/or the tenancy graphs based upon the information in the content matching templates. It is to be understood that each of the processing engine components 202-212 may utilize various AI models and algorithms to perform their respective functionality. For instance, the AI models and algorithms may be or include classification models and algorithms or regression models and algorithms. The AI models and algorithms may be or include neural networks, decision trees, support vector machines, Bayesian networks, and so forth.

Referring briefly now to FIG. 3, a functional block diagram of the runtime assistance engine 114 is illustrated. In general, runtime assistance engine 114 is configured to aid users in selecting and incorporating contextual data into content generated by content authoring applications. The runtime assistance engine 114 includes a runtime context extraction component 302, a candidate generation component 304, a filtering component 306, a personalization component 308, and a feedback component 310 (collectively referred to herein as "the runtime assistance engine components 302-310"). The runtime content extraction component 302 is generally configured to extract contexts from keywords that have been input by users. The runtime content extraction component 302 may also identify topics from keywords, which may then be utilized to identify nodes representing the topic in subgraphs of user graphs. The candidate generation component 304 is generally configured to identify candidate contextual data (from amongst a plurality of candidate contextual data) that may be presented to users. The filtering component 306 is generally configured to filter duplicative contextual data that has been identified and/or generated by the processing engine 112. The personalization component 308 is generally configured to include contextual data in content generated by content authoring applications. The feedback component 310 is configured to receive feedback from users as to whether contextual data identified by the AI personalization application 110 was relevant to the user 120. The AI personalization application 110 may update the AI models and algorithms based upon the feedback. It is to be understood that each of the runtime assistance engine components 302-310 may utilize the AI models and algorithms referenced above to perform their respective functionality. Although the runtime assistance engine components 302-310 have been depicted as being implemented on the computing system 102 (i.e., server-side), it is to be understood that some or all of the functionality of the runtime assistance engine components 302-310 may be implemented client-side.

Referring back to FIG. 1, the computing system 102 further includes a graph data store 116. The graph data store 116 includes a user graph 118 for a user 120. The user graph 118 for the user 120 includes nodes and edges connecting the nodes. Each node represents an entity, where the entity may be the user 120, a topic, content associated with (e.g., created by, edited by, accessed by, able to be accessed by, and/or viewed by) the user 120, another user, or a tenancy (e.g., a group, a team, or an organization) of the user 120. Thus, the user graph 118 for the user 120 is a heterogenous graph. Nodes in the user graph 118 representing content may include metadata for the content (e.g., an identifier for the content, an identifier for a storage location of the content, a time of creation of the content, etc.). Each edge is assigned criteria that is indicative of a relationship between entities represented by nodes that are connected by a respective edge. In an example, content represented by a node in the user graph 118 may be a slideshow presentation, a document, a spreadsheet, an email, or a real-time message. Although the graph data store 116 is depicted as storing a single user graph, it is to be understood that the graph data store 116 may store different user graphs for different users.

Figure 4A:
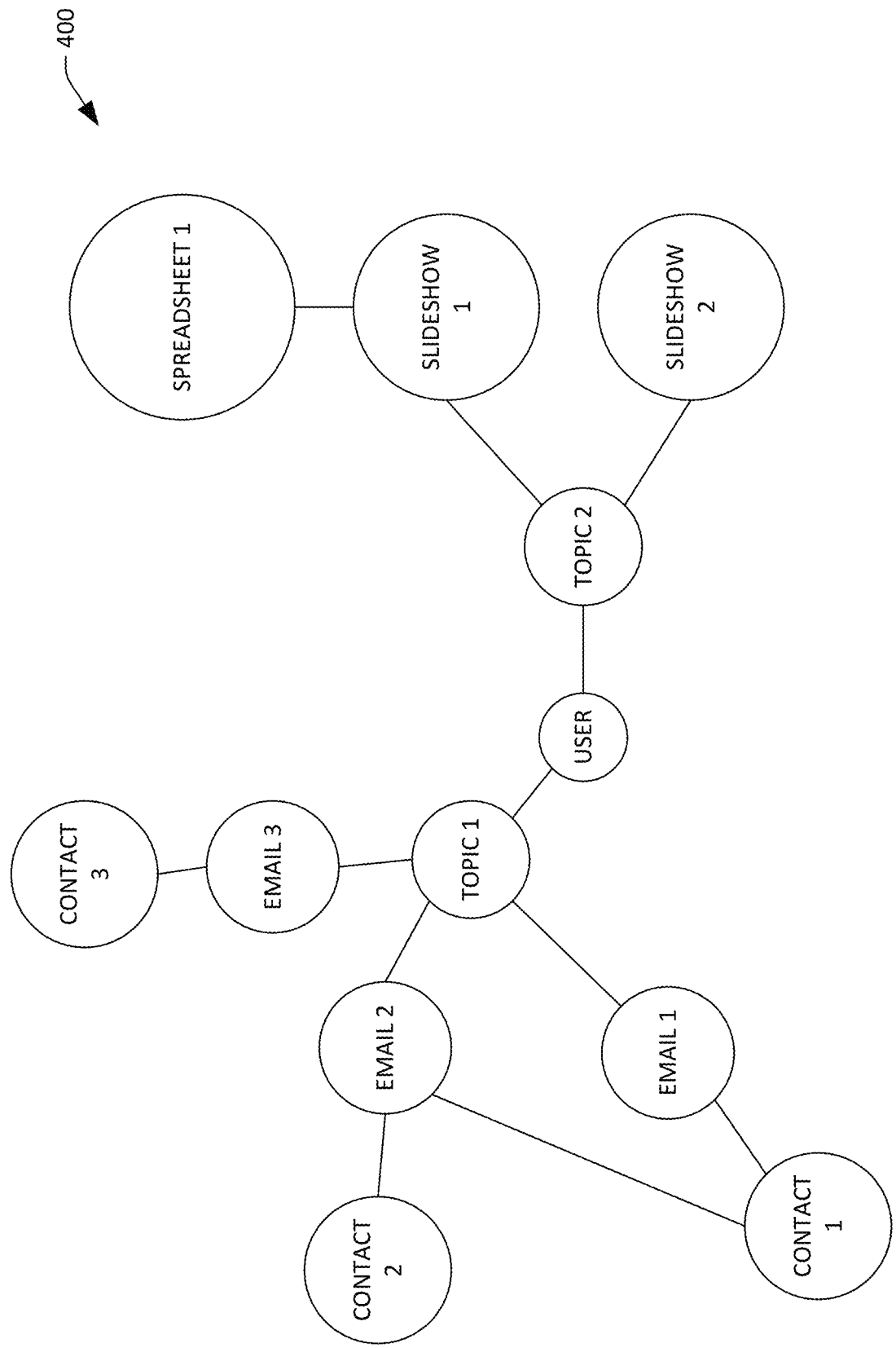
FIG. 4A is an illustration of an example user graph.

Referring briefly now to FIG. 4A, an example user graph 400 is depicted. The user graph 400 may be the user graph 118. As illustrated in FIG. 4A, the user graph 400 includes nodes (represented in FIG. 4A as circles) and edges connecting the nodes (represented in FIG. 4A as straight lines). Each edge in the edges of the user graph 400 is assigned criteria that is indicative of a relationship between entities represented by nodes that are connected by a respective edge. In an example, an edge connecting a node representing topic 1 to a node representing email 3 may be assigned criteria indicating that email 3 pertains to topic 1. In another example, an edge connecting the node representing topic 1 to a node representing contact 3 may be assigned criteria indicating that the user 120 sent email 3 to contact 3.

Figure 4B:
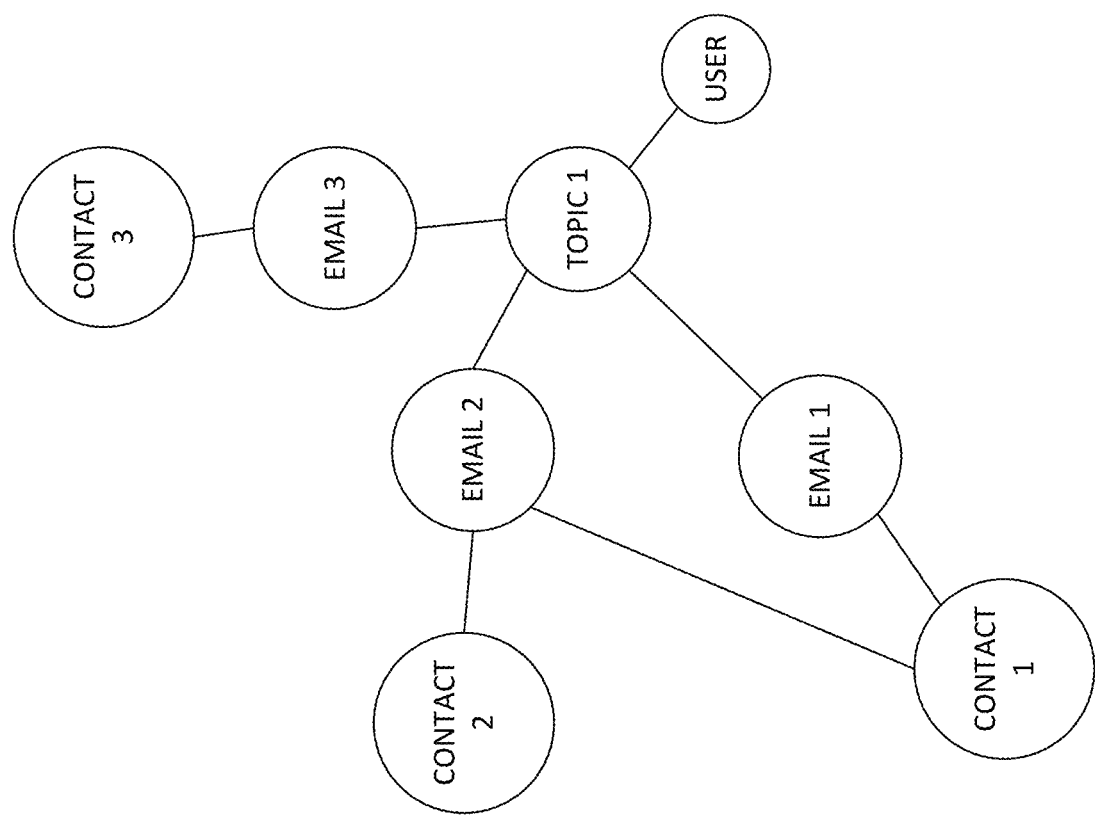
FIG. 4B is an illustration of an example subgraph of the example user graph illustrated in FIG. 4A.

Turning briefly to FIG. 4B, an example subgraph 402 of the example user graph 400 illustrated in FIG. 4A is depicted. As has been described above and as will be described in greater detail below, the AI personalization application 110 walks the user graph 400 (based upon one or more keyword) in order to identify the subgraph 402. In the example subgraph 402, the keyword is "topic 1", and as such the subgraph 402 includes the topic 1 node and other nodes that are connected (either directly or through other nodes) to the topic 1 node. As illustrated in FIG. 4B, the subgraph 402 does not include the topic 2 node, the slideshow 1 node, the slideshow 2 node, or the spreadsheet 1 node (shown in FIG. 4A). The AI personalization application 110 performs processing on entities represented by nodes in the subgraph 402 in order to generate and/or identify contextual data for the user 120.

Referring back to FIG. 1, in some embodiments, the graph data store 116 may also include a tenancy graph 122. The tenancy graph 122 is similar to the user graph 118. For instance, the tenancy graph 122 includes nodes and edges connecting the nodes. Each node in the tenancy graph 122 represents an entity, where the entity may be a topic, content of the tenancy, different users of the tenancy, etc. However, unlike the user graph 118, nodes representing content in the tenancy graph 122 represent content that is associated with the tenancy and that is accessible to the user 120, but that may or may not have been previously accessed by the user. For this reason, the tenancy graph 122 may include nodes (e.g., representing topics) and edges that are not represented in the user graph 118 and vice versa. Although not depicted in FIG. 1, it is to be understood that the user 120 may belong to more than one tenancy, and hence, the graph data store 116 may store a tenancy graph for each tenancy to which the user 120 belongs (as well as tenancy graphs for tenancies to which the user 120 does not belong).

The computing system 102 may additionally include a contextual data store 124. The contextual data store 124 includes contextual data 126 for the user 120. As will be described in greater detail below, the AI personalization application 110 may store the contextual data 126 for the user 120 in the contextual data store 124 based upon a walk (and subsequent processing) of the user graph 118 for the user 120. The contextual data 126 for the user 120 may include content (represented by at least one node in the user graph 118) of the user 120, a portion of the content (represented by at least one node in the user graph 118) of the user 120, and/or data that has been derived from the content (represented by at least one node in the user graph 118) of the user via the processing engine 112. In some embodiments, the contextual data 126 for the user 120 may also be based upon a walk (and subsequent processing) of the tenancy graph 122.

The computing environment 100 additionally includes a computing device 128 operated by the user 120. In an example, the computing device 128 may be a desktop computing device, a laptop computing device, a tablet computing device, a smartphone, etc. The computing device 128 is in communication with the computing system 102 by way of a network 130 (e.g., the Internet, intranet, etc.). The computing device 128 includes a processor 132 and memory 134, where the memory 134 has a content authoring application 136 loaded therein. In general, the content authoring application 136 is designed to generate content. In an example, the content authoring application 136 may be or include a slideshow application, a word processing application, a spreadsheet application, an email application, or a real-time messaging application. As such, the content generated and/or presented by the content authoring application 136 may be or include a slideshow presentation, a document, a spreadsheet, an email, or a real-time message. As will be described in greater detail below, the content authoring application 136 is configured to communicate with the AI personalization application 110 such that the contextual data 126 for the user 120 (or a portion thereof) is included in the content generated and/or presented by the content authoring application 136.

The computing device 128 further includes input components 138 that enable the computing device 128 to receive input from the user 120. The input components 138 may include a mouse, a keyboard, a trackpad, a scroll wheel, a microphone, a camera, a video camera, etc. The computing device 128 also includes output components 140 that enable data to be presented to the user 120. The output components 140 include a display 142, whereupon graphical features may be presented thereon. For instance, a graphical user interface (GUI) for the content authoring application 136 may be presented on the display 142. The output components 140 may also include a speaker, a haptic feedback device, etc. (not illustrated in FIG. 1).

The computing environment 100 further includes a first user data source 144 that stores data of the user 120. For instance, the first user data source 144 may store the content generated by the content authoring application 136, content generated by other content authoring applications, or other data associated with the user 120. For instance, the first user data source 144 may store a slideshow presentation, a document, a spreadsheet, and/or a real-time message. The computing environment 100 may also include an Nth user data source 146 that also stores content generated by the content authoring application 136, content generated other content authoring applications, or other data associated with the user 120, where N is a positive integer greater than one. The first user data source 144 and the Nth user data source 146 are collectively referred to herein as "the plurality of user data sources 144-146." Although the plurality of user data sources 144-146 are depicted in FIG. 1 as being external to the computing system 102 and the computing device 128, other possibilities are contemplated. For instance, the plurality of user data sources 144-146 may include a data source that is part of the computing device 128 (i.e., local storage), a data source that is part another computing device of the user 120, a data source that is part of the computing system 102, a data source that is part of a cloud computing service, a data source that is part of a server computing device (not illustrated in FIG. 1), or a combination thereof.

Referring now to FIG. 1, operation of the computing environment 100 is now set forth. If the user 120 opts-in, the graph application 108 obtains (i.e., receives or generates) user activity data of the user 120 from a plurality of applications and generates and maintains the user graph 118 for the user 120 based upon the user activity data. The user activity data may include historical activity data of the user 120 and/or real-time data of the user 120 collected via a plugin or interop communication. With more specificity, when an application in the plurality of application accesses content for the user 120, the graph application 108 identifies at least one topic of the content (e.g., using AI models and algorithms). Upon identifying the topic(s), the graph application 108 identifies at least one seed node in the user graph 118 representing the topic(s). In the event that a node representing the topic(s) does not exist in the user graph 118, the graph application 108 generates the seed node and adds it to the user graph 118. The graph application 108 also generates a second level node representing the content. The second level node representing the content may include metadata for the content. For instance, the metadata may include an identifier for the content, an identifier for a user data source in the plurality of user data sources 144-146 that stores the content, a time of creation of the content, etc. The graph application 108 then connects the seed node(s) to the second level node representing the content via at least one edge, where the graph application 108 assigns the edge with criteria that is indicative of a relationship between the seed node and the second level node. It is to be understood that the graph application 108 may connect second level node to many different nodes in the user graph 118 via different edges. For instance, the second level node may be connected to a node representing a contact of the user 120 (i.e., a third level node) via a second edge, where the contact of the user 120 contributed to the content. Additionally or alternatively, the second level node may be connected to a second seed node that represents a different topic.

In some embodiments, the graph application 108 also generates and maintains the tenancy graph 122 for the tenancy of the user 120. The tenancy graph 122 is similar to the user graph 118 for the user 120. For instance, the tenancy graph 122 includes nodes representing entities and edges connecting the nodes. Each edge is assigned criteria that is indicative of a relationship between entities represented by nodes that are connected by a respective edge. However, unlike the user graph 118 for the user 120, nodes representing content in the tenancy graph 122 represent content that is associated with the tenancy and that is accessible to the user 120, but which the user 120 may or may not have accessed.

The content authoring application 136 receives an indication that the user 120 desires content to be generated for a topic; for instance, the content authoring application 136 can receive one or more keywords from the user 120 (e.g., a query, a title, or a topic sentence), and the AI personalization application 110 can obtain (i.e., generate or receive) the keyword(s) and an identifier for the user 120 and identify the topic based upon the keyword(s). The AI personalization application 110 identifies the user graph 118 from amongst a plurality of user graphs stored in the graph data store 116 based upon the identifier for the user 120. For instance, the AI personalization application 110 may execute a search over the graph data store 116 based upon the identifier for the user 120. The search produces search results that include the user graph 118. The AI personalization application 110, upon identifying the topic, walks the user graph 118 based on the topic in order to identify a subgraph for the topic in the user graph 118. With more specificity, the AI personalization application 110 identifies at least one node in the user graph 118 that represents the topic (i.e., at least one seed node). The AI personalization application 110 then traverses edges that connect the seed node(s) to reach second level nodes in the user graph 118 ("a first level of expansion"). For each second level node (or for selected second level nodes of a given type), the AI personalization application 110 traverses edges connecting the second level nodes to third level nodes ("a second level of expansion"). This process may continue until the AI personalization application 110 reaches a threshold level of expansion (e.g., three levels of expansion, four levels of expansion), whereupon the subgraph identification is completed. In an example where the threshold level of expansion is two and the topic is "Project 1", the AI personalization application 110 may identify a seed node representing Project 1. In the example, as a first level of expansion, the AI personalization application 110 may identify nodes representing emails (i.e., second level nodes) related to Project 1 by traversing edges in the user graph 118 that connect the seed node to the second level nodes. Following the example, as a second level of expansion, the AI personalization application 110 may identify nodes representing contacts of the user 120 identified in the emails (i.e., third level nodes) by traversing edges in the user graph 118 that connect the second level nodes to the third level nodes. In some embodiments, the AI personalization application 110 walks one or more tenancy graphs (e.g., the tenancy graph 122) of the user 120 based on the topic in order to identify one or more additional subgraphs for the topic.

In some embodiments, the threshold level of expansion is a number of edges. In some embodiments, the AI personalization application 110 walks the user graph 118 periodically (e.g., once an hour, once a day, once a week, etc.). In some embodiments, the AI personalization application 110 walks the user graph 118 each time the user graph 118 is modified by the graph application 108. For instance, in some embodiments, when the graph application 108 adds a new node representing new content accessed by the user 120, the AI personalization application 110 walks the user graph 118.

The AI personalization application 110 may perform processing on nodes of the subgraph. In order to process a node in the subgraph, the AI personalization application 110 accesses metadata included in the node. As the metadata includes an identifier for a storage location (e.g., one of the plurality of user data sources 144-146) of content represented by the node and an identifier for the content, the AI personalization application 110 may retrieve the content based upon an identifier for the storage location of the content and the identifier for the content. The AI personalization application 110 then processes the content represented by the node. With more specificity, for a node in the subgraph representing content, the AI personalization application 110 may perform context identification on the content, identification of entities referenced in the content, structured data processing on the content, unstructured data processing on the content, natural language processing (NLP) on the content, and template processing on the content via the processing engine components 202-212 described above. In some embodiments, the AI personalization application 110 ranks the nodes of the subgraph using a ranking algorithm that is configured to rank content (e.g., documents) based upon suitable factors, including but not limited to a number of times that the content has been accessed, a number of references in the content to other content, a number of references to the content in the other content, manually set forth relevance scores, etc. In some embodiments, the AI personalization application 110 performs processing on nodes that are ranked above a threshold level. The processing generates and/or identifies the contextual data 126. The contextual data 126 may include the content itself, a portion of the content, and/or data that is derived from the content. The AI personalization application 110 may store the contextual data 126 in the contextual data store 124. In some embodiments, the AI personalization application 110 may also perform the processing on nodes of the second subgraph of the tenancy graph 122 as well to generate second contextual data from the second subgraph. In some embodiments, the AI personalization application 110 stores the second contextual data in the contextual data store 124 with the contextual data 126.

It is contemplated that the content authoring application 136 is being utilized by the user 120 in order to generate content. In an example, the content authoring application 136 may be an email application and the content may be an email. The content authoring application 136 transmits one or more keywords and an identifier for the user 120 to the AI personalization application 110. In the example, the keyword may be a title of the email. The AI personalization application 110 identifies a topic based upon the keyword(s), identifies at least one seed node in the user graph 118 based upon the topic, walks the user graph 118 from the seed node(s) to identify the subgraph, and identifies the contextual data 126 for the user 120, where the contextual data 126 corresponds to content represented by nodes in the subgraph. In some embodiments, the AI personalization application 110 identifies the contextual data 126 for the user 120 (or a portion thereof) stored in the contextual data store 124 based upon the keyword(s) and the identifier for the user 120, where the contextual data 126 for the user 120 corresponds to content represented by nodes in the subgraph.

The AI personalization application 110 causes the contextual data 126 (or a portion thereof) to be included in the content generated and/or presented by the content authoring application 136. With more specificity, the AI personalization application 110 (via the runtime assistance engine 114) may execute a search over the contextual data store 126 based upon the keyword and the identifier for the user 120. The search produces search results that include the contextual data 126. The AI personalization application 110 transmits the contextual data 126 to the content authoring application 136 and the content authoring application 136 includes the contextual data 126 in the content. In the example above, the contextual data 126 included in the email may be a table extracted from a spreadsheet accessed by the user 120, a definition of an acronym defined in a document of the user 120, a slide from a slideshow presentation previously accessed by the user 120, a summarization of a document accessed by the user 120, an image included in an email previously sent by the user 120, etc.

The content authoring application 136 may present the contextual data 126 that is included in the content on the display 142 so that the user 120 may examine the contextual data 126. In some embodiments, the AI personalization application 110 also identifies the second contextual data (from the tenancy graph 122) in the contextual data store 124 and causes at least a portion of the second contextual data to be included and displayed in the content. The content authoring application 136 may then receive input from the user 120 which edits the contextual data 126 included in the content (or which edits other portions of the content) or which removes the contextual data 126 (or a portion thereof) from the content. The content authoring application 136 may store the content (including the contextual data 126) in computer-readable storage, such as in one of the plurality of user data sources 144-146. Additionally, the computing device 128 may receive input from the user 120 which causes the content (including the contextual data 126) to be transmitted (e.g., via email) to another computing device (not shown in FIG. 1).

In some embodiments, the contextual data 126 includes first candidate contextual data, second candidate contextual data, and third candidate contextual data, and as such the AI personalization application 110 identifies the first candidate contextual data, the second candidate contextual data, and the third candidate contextual data in the contextual data store 124 based upon the keyword and the identifier for the user 120. The AI personalization application 110 ranks the first candidate contextual data, the second candidate contextual data, and the third candidate contextual data based upon the keyword. The AI personalization application 110 transmits an identifier for the first candidate contextual data, an identifier for the second candidate contextual data, and an identifier for the third candidate contextual data to the content authoring application 136, where the content authoring application 136 presents the identifier for the first candidate contextual data, the identifier for the second candidate contextual data, and the identifier for the third candidate contextual data on the display 142 in an order determined by the ranking. In an example, the identifier for the first candidate contextual data may be an identifier for content that the first candidate contextual data is from or derived from, a portion of the content that the first candidate contextual data is from or derived from, or a combination thereof. In an example, the content authoring application 136 receives a selection of the identifier for the second candidate contextual data as input from the user 120. The content authoring application 136 transmits an indication of the selection of the second candidate contextual data to the AI personalization application 110. Upon receiving the indication, the AI personalization application 110 transmits the second candidate contextual data to the content authoring application 136, whereupon the content authoring application 136 includes the second candidate contextual data in the content that is being generated by the content authoring application 136. The AI personalization application 110 may also utilize the indication as feedback to update AI models and algorithms used in the processing that generates the contextual data 126. For instance, the selection of the identifier for the second candidate contextual data may cause the second candidate contextual data to be ranked higher in subsequent rankings performed by the AI personalization application 110 for the user 120.

In some embodiments, the contextual data 126 (which may be stored in the contextual data store 134) may be in a first format; however, the content generated by the content authoring application 136 may only accept data in a second format. In some embodiments, upon receiving an indication that the content authoring application 136 utilizes the second format, the AI personalization application 110 performs a mapping of the contextual data 126 (stored in the first format) to the second format such that the contextual data 126 (now formatted in the second format) may be included in the content generated by the content authoring application 136.

Although the AI personalization application 110 has been described above as walking the user graph 118 and storing the contextual data 126 in the contextual data store 124 prior to receiving the keyword and the identifier for the user 120 from the content authoring application 136, other possibilities are contemplated. For instance, in some embodiments, the AI personalization application 110 walks the user graph 118 at runtime (i.e., responsive to receiving the keyword and the identifier for the user 120) such that the contextual data 126 for the user 120 is generated on demand at runtime, as opposed to being pre-generated and stored in the contextual data store 124. In such embodiments, the contextual data store 124 may be unnecessary. In some embodiments, when the AI personalization application 110 performs a search of the contextual data store 124 based upon the keyword and the identifier for the user 120, but the search fails to yield search results, the AI personalization application 110 walks the user graph 118 based upon the keyword and the identifier for the user 120. In such embodiments, the AI personalization application 110 performs, at runtime, the processing (via the processing engine 112 and the runtime assistance engine 114). In some embodiments, the AI personalization application 110 performs a combination of pre-generating first contextual data prior to runtime (which is stored in and retrieved from the contextual store 124) and generating second contextual data (based upon a walk of the user graph 118 and/or the tenancy graph 122) at runtime.

Although the AI personalization application 110 and the content authoring application 136 have been described above as executing on the computing system 102 and the computing device 128, it is to be understood that in some embodiments, the AI personalization application 110 and the content authoring application 136 are executed on the same computing device. For instance, in some embodiments, the AI personalization application 110 and the content authoring application 136 both execute on the computing device 128.

In some embodiments, the AI personalization application 110 receives identifiers for users that are to receive and access (e.g., view) the content generated by the content authoring application 136. The AI personalization application 110 identifies access control information based on the identifiers for the users. The AI personalization application 110 identifies and walks tenancy graphs based upon the access control information. For instance, the AI personalization application 110 may identify tenancy graphs of tenancies to which each of the users belong and walk the tenancy graphs to generate/identify contextual data such that the contextual data includes information that the users are authorized to access. Additionally or alternatively, the AI personalization application 110 may limit the walk of the tenancy graph 122 (or other tenancy graphs) based upon the access control information such that the contextual data includes information that the users are authorized to access.

Figure 5A:
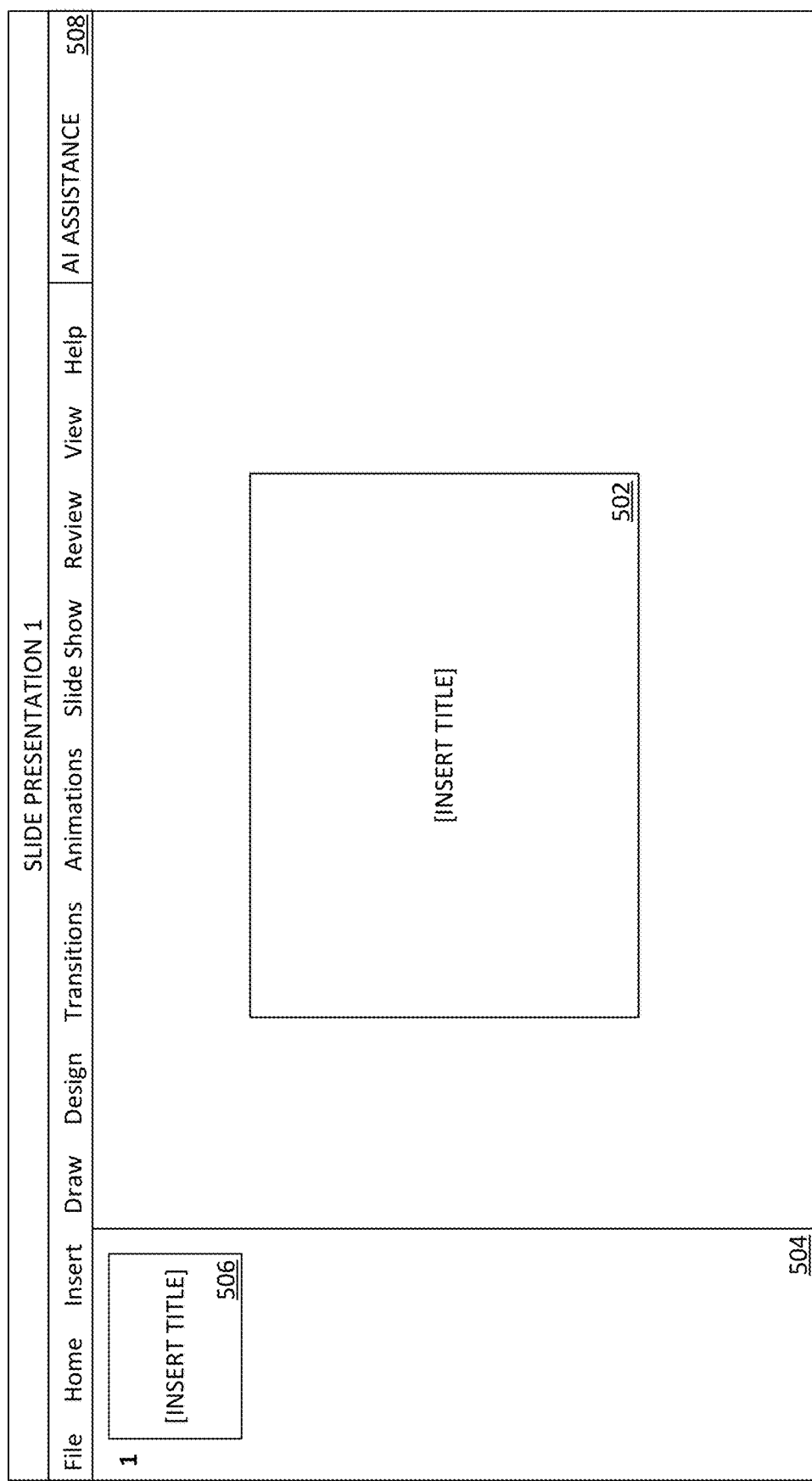

FIGS. 5A-E illustrate different views of an example graphical user interface (GUI) 500 of a slideshow application. In an example, the slideshow application may be the content authoring application 136. With reference specifically now to FIG. 5A, the GUI 500 includes a first slide 502 of a slideshow presentation. As illustrated in FIG. 5A, the first slide 502 is initially blank and is awaiting a title (indicated by "[INSERT TITLE]"). The GUI 500 also includes a preview pane 504, which displays a first thumbnail 506 of the first slide 502. The GUI 500 also includes an AI assistance button 508. The slideshow application may receive the title as input from the user 120, followed by a selection of the AI assistance button 508. Selection of the AI assistance button 508 causes the slideshow application to transmit the title (i.e., a keyword) and an identifier for the user 120 to the AI personalization application 110.

Figure 5B:
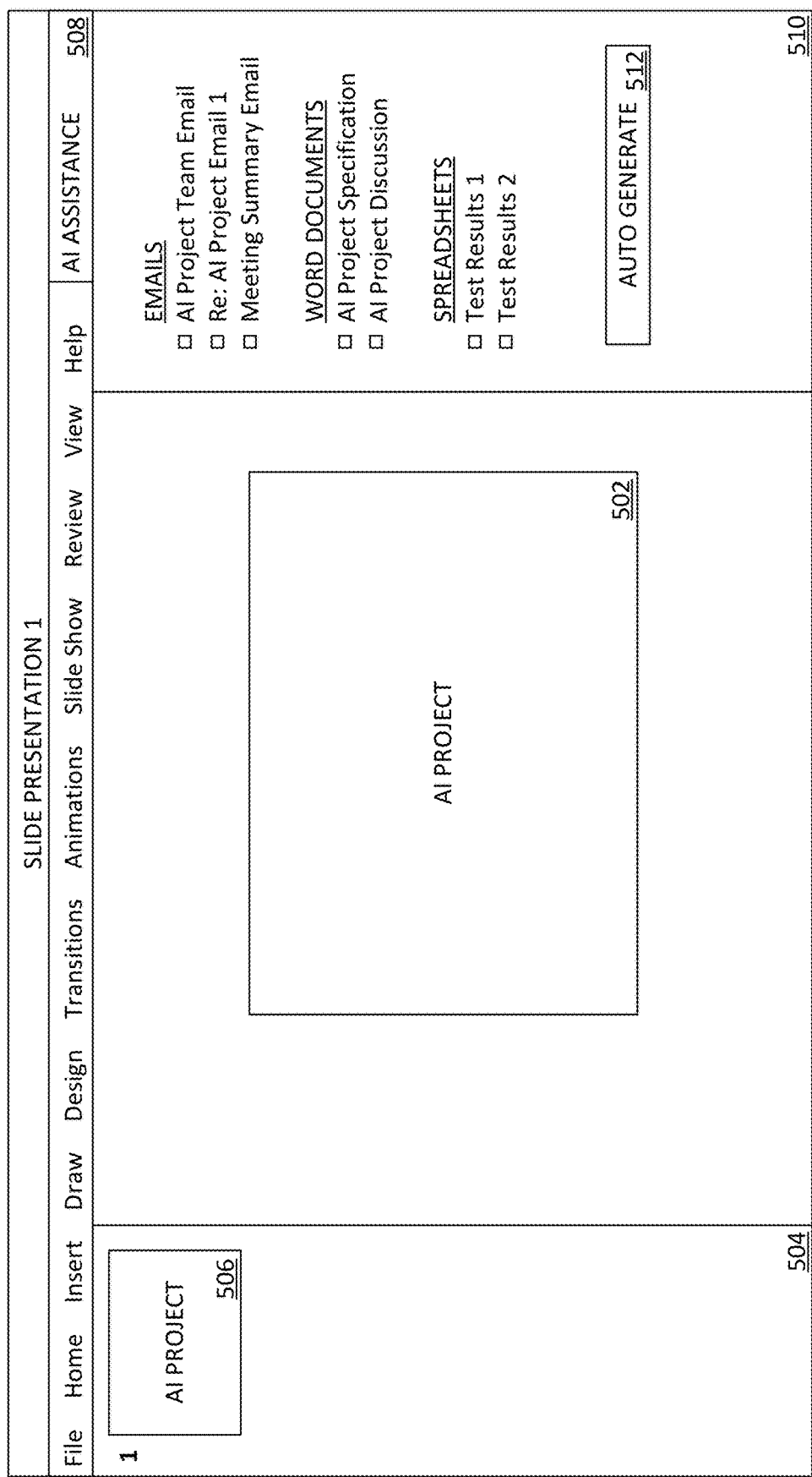

With reference now to FIG. 5B, the GUI 500 is depicted after the slideshow application has received the title ("AI Project") as input and after the selection of the AI assistance button 508. The GUI 500 now includes an AI assistance pane 510. The AI assistance pane 510 includes identifiers for a plurality of content that is associated with the user 120. For instance, as depicted in FIG. 5B, the AI assistance pane 510 includes identifiers for emails, identifiers for word documents, and identifiers for spreadsheets. The AI personalization application 110 has retrieved the identifiers for the plurality of content from the contextual data store 124. Each of the identifiers for the plurality of content is selectable, as indicated by the boxes next to each identifier. In an example, the slideshow application receives a selection of "AI Project Team Email," "AI Project Specification," and "Test Results 1" from the user 120. The slideshow application then receives a selection of an auto generate button 512 displayed within the AI assistance pane 510, thereby causing the slideshow application to transmit the selected identifiers to the AI personalization application 110. The AI personalization application 110 causes contextual data (e.g., the contextual data 126) corresponding to the selected identifiers to be included in the slideshow presentation.

Figure 5C:
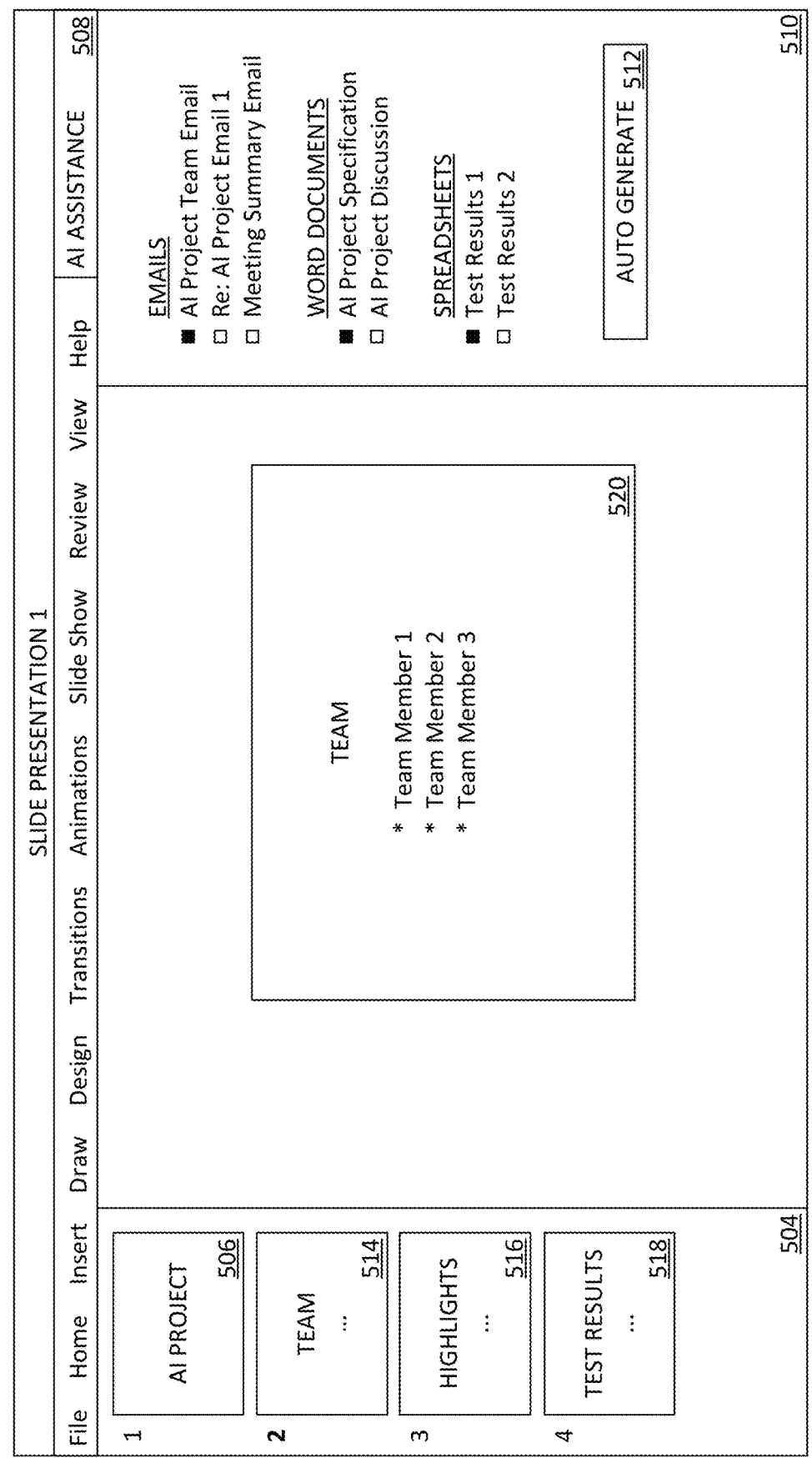

Turning now to FIG. 5C, the GUI 500 is depicted after the slideshow application has received the selection of the auto generate button 512 and after the contextual data has been incorporated into the slideshow presentation. Darkened boxes next to "AI Project Team Email," "AI Project Specification," and "Test Results 1" indicate that each of these identifiers have been selected by the user 120. The preview pane 504 of the GUI 500 now includes a second thumbnail 514, a third thumbnail 516, and a fourth thumbnail 518. Each of the second thumbnail 514, the third thumbnail 516, and the fourth thumbnail 518 represent slides that have been auto generated and included in the slideshow presentation. As illustrated in FIG. 5C, the second thumbnail 514 has been selected, and as such a second slide 520 corresponding to the second thumbnail 514 is displayed within the GUI 500. The second slide 520 includes names for team members who contributed to the AI project (i.e., contextual data), which were identified and extracted from the AI Project Team Email by the AI personalization application 110 using the processes described above.

Figure 5D:
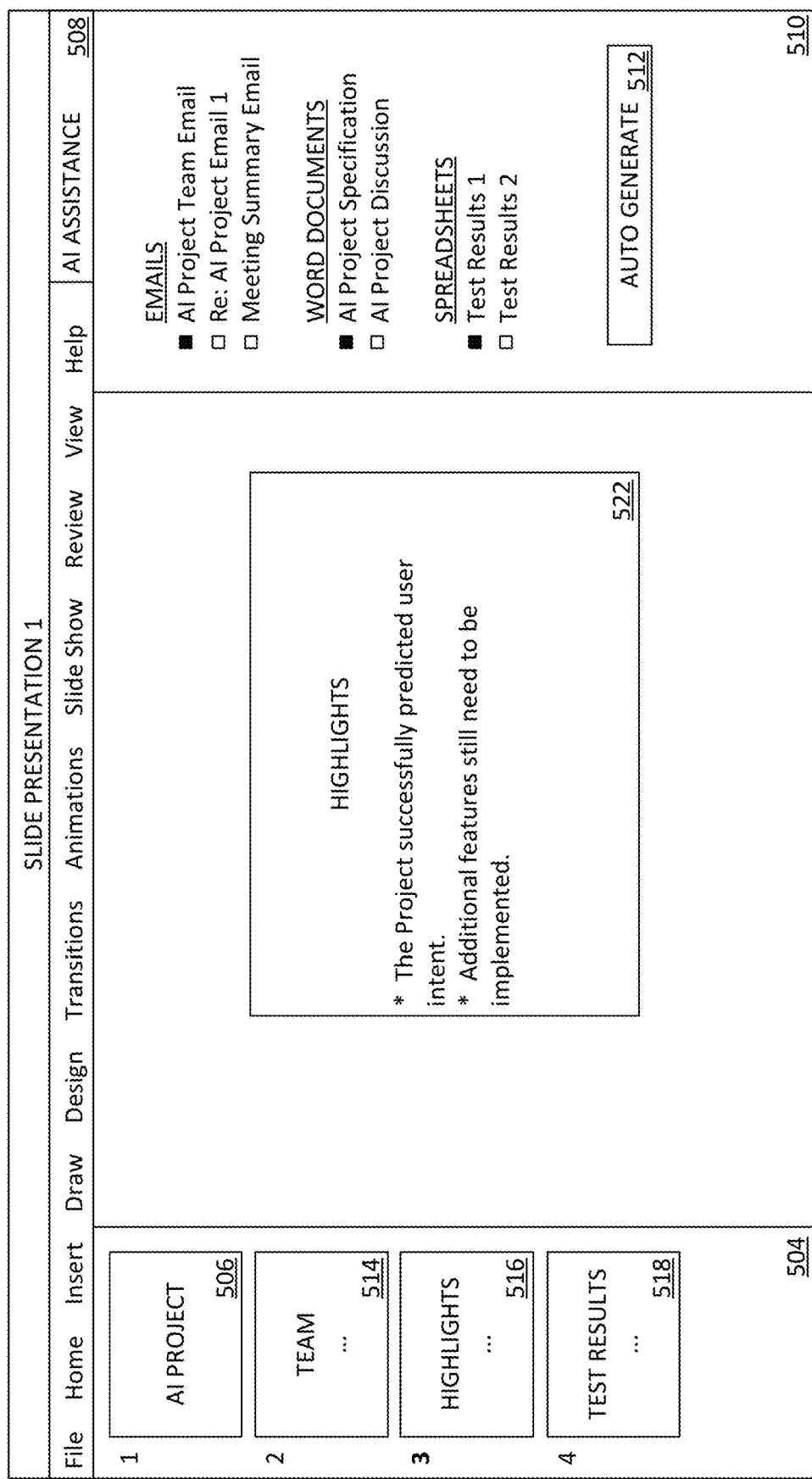

Referring now to FIG. 5D, the third thumbnail 516 has been selected, and as such a third slide 522 corresponding to the third thumbnail 516 is displayed within the GUI 500. The third slide 522 includes highlights of the AI project (i.e., contextual data), which have been summarized from the AI project specification document by the AI personalization application 110 using the processes described above.

Figure 5E:
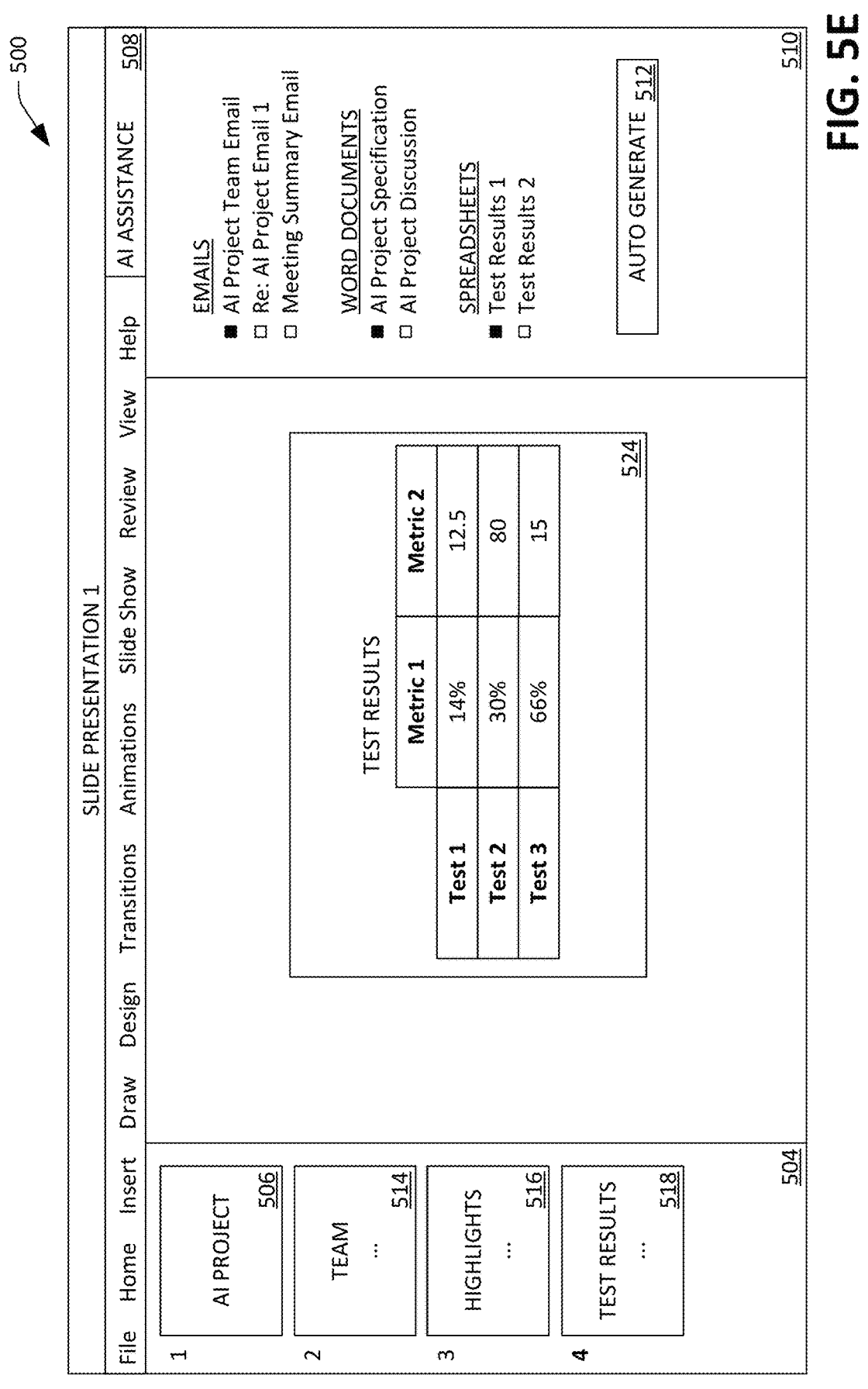

Turning now to FIG. 5E, the fourth thumbnail 518 has been selected, and as such a fourth slide 524 corresponding to the fourth thumbnail 518 is displayed within the GUI 500. The fourth slide 524 includes test results from the test results 1 spreadsheet. The spreadsheet may store the test results in a first format (e.g., extensible markup language (XML)), but the slideshow application may utilize a second format for tables. As such, the AI personalization application 110 performs a mapping of the first format to the second format such that the test results (i.e., contextual data) is included in the slideshow presentation.

Figure 6:
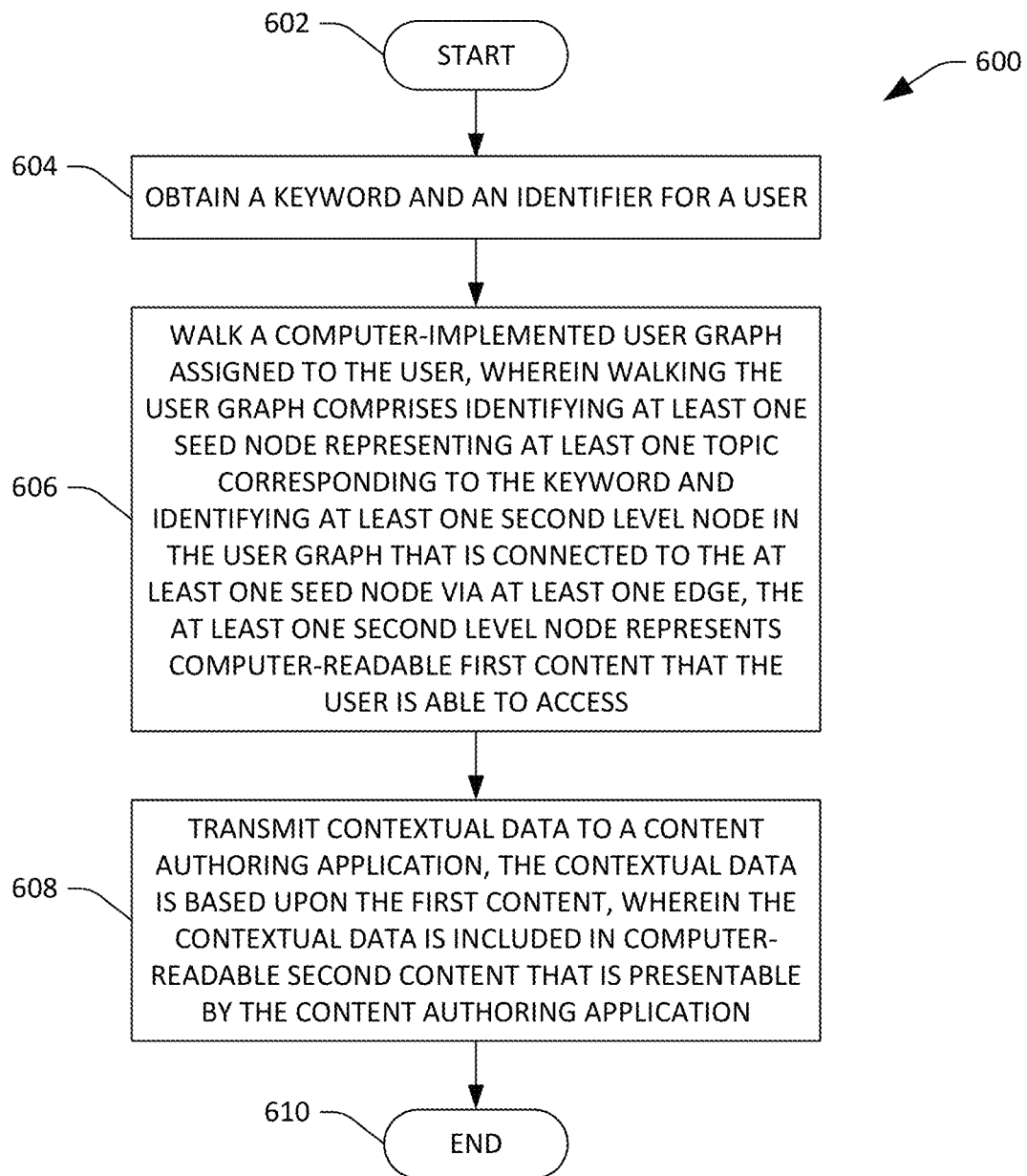
FIG. 6 is a flow diagram that illustrates an example methodology executed by a computing system for AI driven personalization of content generated by a content authoring application.
Figure 7:
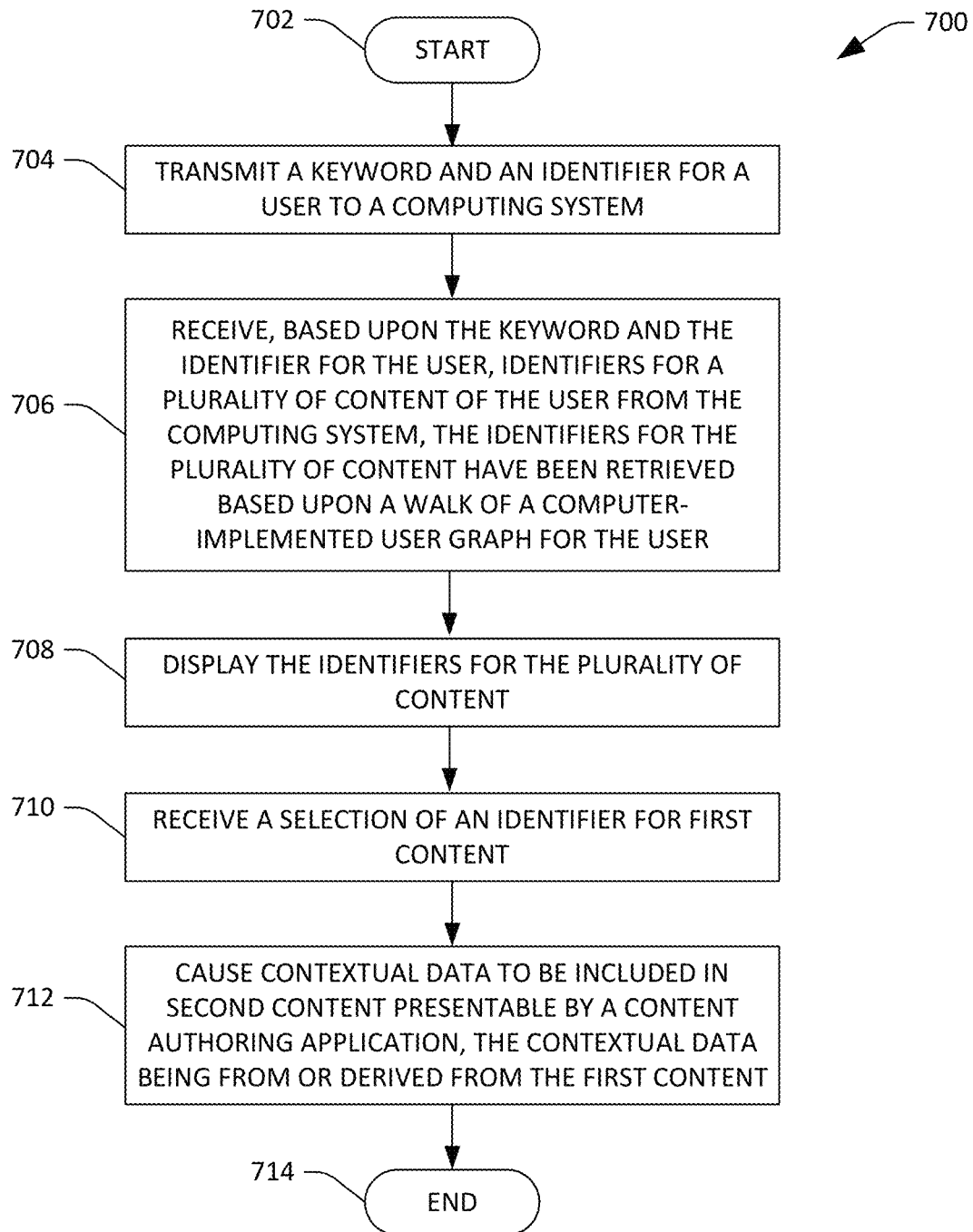
FIG. 7 is a flow diagram that illustrates an example methodology executed by a computing device for AI driven personalization of content generated by a content authoring application.

FIGS. 6 and 7 illustrate example methodologies relating to AI driven personalization of content generated by a content authoring application. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 6, an example methodology 600 executed by a computing system that facilitates AI driven personalization of content generated by a content authoring application is illustrated. The methodology 600 begins at 602, and at 604, the computing system obtains a keyword and an identifier for a user of a content authoring application. At 606, the computing system walks a computer-implemented user graph that is assigned to the user based upon the keyword and the identifier for the user. The user graph includes nodes and edges connecting the nodes. The user graph is identified from amongst several computer-implemented graphs based upon the identifier for the user. The walk comprises identifying at least one seed node in the user graph that represents at least one topic corresponding to the keyword. The walk also comprises identifying at least one second level node in the user graph that is connected to the at least one seed node via at least one edge. The at least one second level node represents computer-readable first content that the user is able to access. At 608, the computing system transmits contextual data to the content authoring application, the contextual data being based upon the first content. The contextual data is included in computer-readable second content that is presentable by the content authoring application. The methodology 600 concludes at 610.

Turning now to FIG. 7, an example methodology 700 executed by a computing device that facilitates AI driven personalization of content generated by a content authoring application is illustrated. The methodology 700 begins at 702, and at 704, the computing device transmits a keyword and an identifier for a user of the computing device to a computing system. At 706, based upon the keyword and the identifier for the user, the computing device receives identifiers for a plurality of (computer-readable) content of the user from the computing system. The identifiers for the plurality of content have been retrieved by the computing system based upon a walk of a computer-implemented user graph for the user. The identifiers for the plurality of content may be titles of the plurality of content or extracted portions of the plurality of content. At 708, the computing device displays the identifiers for the plurality of content on a display (e.g., within a GUI for the content authoring application). At 710, the computing device receives a selection of an identifier for (computer-readable) first content. At 712, the computing device causes contextual data to be included in (computer-readable) second content that is presentable by the content authoring application. The contextual data is from or derived from the first content. The methodology 700 concludes at 714.

Figure 8:
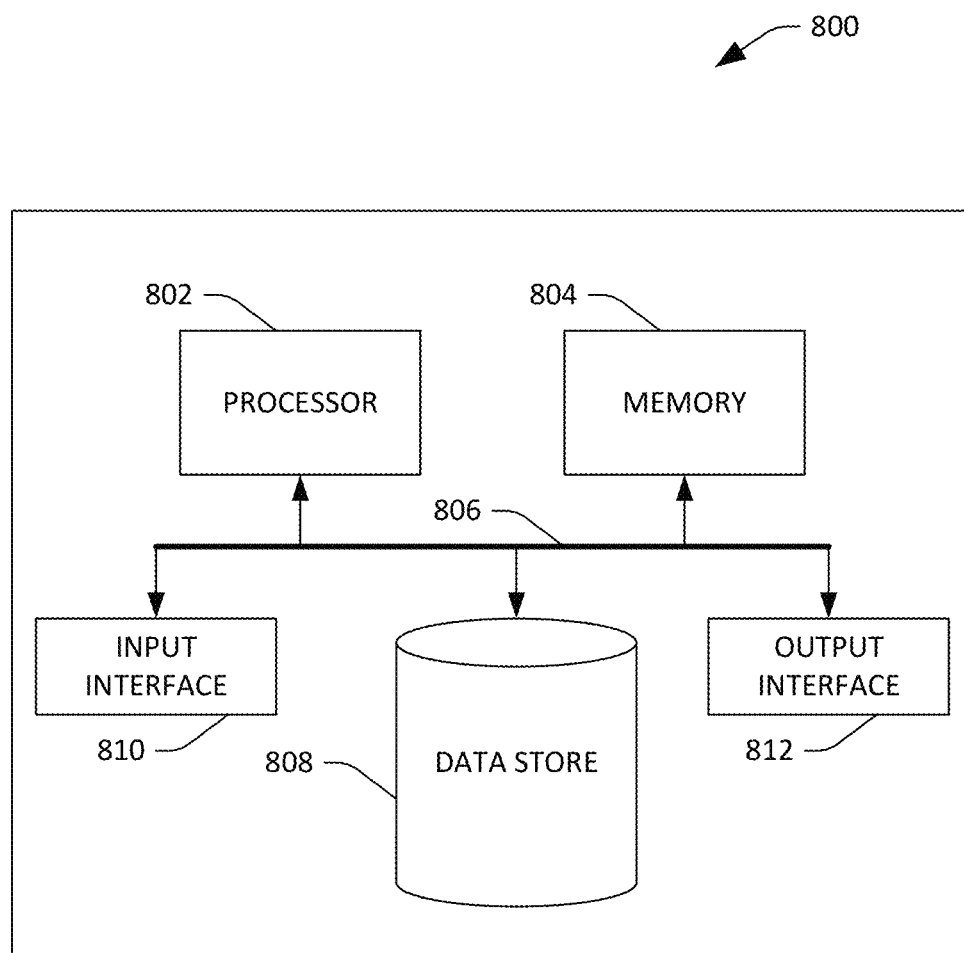
FIG. 8 is an example computing device.

Referring now to FIG. 8, a high-level illustration of an example computing device 800 that can be used in accordance with the systems and methodologies disclosed herein is illustrated. For instance, the computing device 800 may be used in a system that personalizes content generated by a content authoring application based upon a walk of a user graph for a user. By way of another example, the computing device 800 can be used in a system that executes a content authoring application that generates content. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store user graphs, tenancy graphs, contextual data, etc.

The computing device 800 additionally includes a data store 808 that is accessible by the processor 802 by way of the system bus 806. The data store 808 may include executable instructions, user graphs, tenancy graphs, contextual data, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

It is contemplated that the external devices that communicate with the computing device 800 via the input interface 810 and the output interface 812 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 800 in a manner free from constraints imposed by input devices such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise random-access memory (RAM), read-only memory (ROM), electrically erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The present disclosure relates to systems and methods for (AI) driven personalization of content generated by a content authoring application according to at least the examples provided in the sections below:

(A1) In one aspect, some embodiments include a method for that facilitates AI driven personalization of content generated by a content authoring application. The method is performed by a processor (e.g., 104) of a computing system (e.g., 102). The method includes: (a) obtaining (e.g., 604) obtaining a keyword and an identifier for a user (e.g., 120) of a content authoring application (e.g., 110); and (b) based upon the keyword and the identifier for the user, walking (e.g., 606) a computer-implemented user graph (e.g., 118) that is assigned to the user. The user graph includes nodes and edges connecting the nodes. The user graph is identified from amongst several computer-implemented user graphs based upon the identifier for the user. Walking the user graph comprises: (i) identifying at least one seed node in the user graph, the at least one seed node representing at least one topic that corresponds to the keyword; and (ii) identifying at least one second level node in the user graph connected to the at least one seed node via at least one edge, where the at least one second level node represents computer-readable first content that the user is able to access. The method further comprises transmitting (e.g., 608) contextual data (e.g., 126) to the content authoring application, where the contextual data is based upon the first content, and further where the contextual data is included in computer-readable second content that is presentable by the content authoring application.

(A2) In some embodiments of the method of A1, walking the user graph further includes identifying at least one third level node in the user graph connected to the at least one second level node via a second at least one edge, where the at least one third level node represents computer-readable third content that is associated with the user.

(A3) In some embodiments of any of the methods of A1-A2, the method further includes prior to transmitting the contextual data to the content authoring application, transmitting an identifier for the first content and an identifier for the third content to the content authoring application, where the identifier for the first content and the identifier for the third content are presented on a display (e.g., 142); and receiving an indication that the identifier for the first content has been selected, where the contextual data includes data from the first content or data derived from the first content.

(A4) In some embodiments of any of the methods of A1-A3, the at least one second level node comprises an identifier for a user data source that stores the first content and an identifier for the first content. The computing system generates the contextual data by accessing the first content based upon the identifier for the user data source and the identifier for the first content; and processing the first content to generate the contextual data, where the contextual data is stored in a contextual data store (e.g., 124) upon the content being processed.

(A5) In some embodiments of any of the methods of A1-A4, processing the first content includes executing an artificial intelligence (AI) algorithm that takes at least a portion of the first content as input, where the AI algorithm outputs the contextual data.

(A6) In some embodiments of any of the methods of A1-A5, the at least one edge is assigned criteria that is indicative of a relationship between the at least one topic and the first content.

(B1) In another aspect, some embodiments include a computing system (e.g., 102) that includes a processor (e.g., 104) and memory (e.g., 106). The memory stores instructions that, when executed by the processor, cause the processor to perform any of the methods described herein (e.g., any of A1-A6).

(C1) In yet another aspect, a non-transitory computer-readable storage medium includes instructions that, when executed by a processor (e.g., 104) of a computing system (e.g., 102), cause the processor to perform any of the methods described herein (e.g., any of A1-A6).

(D1) In another aspect, some embodiments include a method executed by a computing system (e.g., 102) that includes a processor (e.g., 104) and memory (e.g., 106). The method includes obtaining a keyword and an identifier for a user (e.g., 120) of a content authoring application (e.g., 136); and based upon the keyword and the identifier for the user, walking a computer-implemented user graph (e.g., 118) that is assigned to the user. The user graph comprises nodes and edges connecting the nodes. The user graph is identified from amongst several computer-implemented user graphs based upon the identifier for the user. Walking the user graph includes identifying at least one seed node in the user graph. The at least one seed node represents at least one topic that corresponds to the keyword. Walking the user graph also includes identifying at least one second level node in the user graph connected to the at least one seed node via at least one edge, where the at least one second level node represents computer-readable first content that is associated with the user. The method further includes transmitting contextual data (e.g., 126) to the content authoring application, where the contextual data is based upon the first content. The contextual data is included in computer-readable second content that is presentable by the content authoring application.

(D2) In some embodiments of the method of D1, the keyword is obtained from a user query, a topic sentence, or a title input to the content authoring application.

(D3) In some embodiments of any of the methods of D1-D2, the method further includes prior to obtaining the keyword and the identifier for the user, obtaining user activity data for the user from a plurality of applications, where the plurality of applications including the content authoring application. The method further includes generating the user graph based upon the user activity data.

(D4) In some embodiments of any of the methods of D1-D3, the first content is one of an email; a document; a slideshow presentation; a message that has been sent via a real-time messaging application; or a spreadsheet.

(D5) In some embodiments of any of the methods of D1-D4, the contextual data is at least a portion of the first content.

(D6) In some embodiments of any of the methods of D1-D5, the contextual data is data that is derived from the first content.

(D7) In some embodiments of any of the methods of D1-D6, the contextual data includes a summary derived from the first content via application of a natural language processing (NLP) algorithm to text in the first content.

(D8) In some embodiments of any of the methods of D1-D7, the second content presentable by the content authoring application is one of a slideshow presentation; a document; a spreadsheet; an email; or a message that is to be sent via a real-time messaging application.

(D9) In some embodiments of any of the methods of D1-D8, the method further includes based upon the keyword and the identifier for the user, identifying at least one tenancy of the user. The method further includes for each identified tenancy, walking a computer-implemented tenancy graph (e.g., 122). The tenancy graph comprises second nodes and second edges connecting the second nodes. Walking the tenancy graph includes identifying a second at least one seed node in the tenancy graph. The second at least one seed node represents the at least one topic that corresponds to the keyword. Walking the tenancy graph also includes identifying a second at least one second level node in the tenancy graph connected to the second at least one seed node via a second at least one edge. The second at least one second level node represents computer-readable third content of the tenancy. The method further includes transmitting second contextual data to the content authoring application, where the second contextual data is based upon the third content, and further where the second contextual data is included in the second content that is presentable by the content authoring application.

(D10) In some embodiments of any of the methods of D1-D9, the at least one tenancy of the user is identified based upon the keyword, the identifier for the user, or access control information.

(D11) In some embodiments of any of the methods of D1-D10, identifiers for users are selected by the user, where the users are to view the second content. The access control information is identified based on the selected identifiers for the users. Walking the tenancy graph is limited based upon the access control information.

(E1) In another aspect, a computing system (e.g., 102) includes a processor (e.g., 104) and memory (e.g., 106) storing instructions. The memory stores instructions that, when executed by the processor, cause the processor to perform any of the methods described herein (e.g., any of D1-D11).

(F1) In yet another aspect, a non-transitory computer-readable storage medium includes instructions that, when executed by a processor (e.g., 104) of a computing system (e.g., 102), cause the processor to perform any of the methods described herein (e.g., any of D1-D11).

(G1) In another aspect, some embodiments include a method executed by a computing system (e.g., 102) that includes a processor (e.g., 104) and memory (e.g., 106). The method includes obtaining, over a network (e.g., 130) connection, a keyword and an identifier for a user (e.g., 120) of a content authoring application (e.g., 136) from a computing device (e.g., 128) operated by the user. The method further includes based upon the keyword and the identifier for the user, walking a computer-implemented user graph (e.g., 118) that is assigned to the user. The user graph includes nodes and edges connecting the nodes. The user graph is identified from amongst several computer-implemented user graphs based upon the identifier for the user. Walking the user graph includes identifying at least one seed node in the user graph that represents at least one topic that corresponds to the keyword. Walking the graph further includes identifying at least one second level node in the user graph connected to the at least one seed node via at least one edge. The at least one second level node represents computer-readable first content that is associated with the user. The method further includes transmitting, over the network connection, contextual data (e.g., 126) to the content authoring application. The contextual data is based upon the first content. The contextual data is included in computer-readable second content that is presentable by the content authoring application.

(G2) In some of the embodiments of the method of G1, an identifier for the first content is presented within a graphical user interface (GUI) for the content authoring application. The contextual data is included in the second content in accordance with a selection of the identifier for first content by the user via the GUI.

(G3) In some of the embodiments of any of the methods of G1-G2, the first content includes a data structure in a first format. The contextual data is included in the second content by mapping the data structure in the first format to a second format of the content authoring application. The contextual data included in the second content is in the second format.

(H1) In another aspect, a computing system (e.g., 102) includes a processor (e.g., 104) and memory (e.g., 106) storing instructions. The memory stores instructions that, when executed by the processor, cause the processor to perform any of the methods described herein (e.g., any of G1-G3).

(I1) In yet another aspect, a non-transitory computer-readable storage medium includes instructions that, when executed by a processor (e.g., 104) of a computing system (e.g., 102), cause the processor to perform any of the methods described herein (e.g., any of G1-G3).

As used herein, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system, comprising:
  a processor; and
  memory storing instructions that, when executed by the processor, cause the processor to perform acts comprising:
    obtaining a keyword and an identifier for a user of a content authoring application;
    identifying a user graph based upon the identifier for the user, wherein the user graph is identified from amongst a plurality of computer-implemented user graphs;
    identifying a portion of the user graph corresponding to at least one topic related to the keyword;
    extracting a computer-readable first content from the portion of the user graph;
    obtaining contextual data based upon the first content; and
    transmitting the contextual data to the content authoring application, and wherein the contextual data is included in computer-readable second content that is presentable by the content authoring application.

2. The computing system of claim 1, wherein the keyword is obtained from at least one of a user query, a topic sentence, or a title input to the content authoring application.

3. The computing system of claim 1, the acts further comprising:
  prior to obtaining the keyword and the identifier for the user, obtaining user activity data for the user from a plurality of applications, the plurality of applications including the content authoring application; and
  generating the user graph based upon the user activity data.

4. The computing system of claim 1, wherein the first content is one of:
  an email;
  a document;
  a slideshow presentation;
  a message that has been sent via a real-time messaging application; or
  a spreadsheet.

5. The computing system of claim 1, wherein obtaining the contextual data comprises:
  identifying a first candidate contextual data and a second candidate contextual data; and
  ranking the first candidate contextual data and the second candidate contextual data;
  prior to transmitting the contextual data to the content authoring application, selecting the contextual data based upon the ranking.

6. The computing device of claim 5, wherein the ranking of the first candidate contextual data and the second candidate contextual data is based upon user activity data for the user from a plurality of applications.

7. The computing system of claim 1, wherein the contextual data is generated based upon the first content.

8. The computing system of claim 7, wherein the contextual data comprises a summary derived from the first content, wherein the summary is obtained by way of providing the first content as input into a natural language processing (NLP) model which generates an output comprising the summary.

9. The computing system of claim 7, wherein the generated contextual data comprises an extracted portion of the first content.

10. The computing system of claim 1, wherein the second content presentable by the content authoring application is one of:
  a slideshow presentation;
  a document;
  a spreadsheet;
  an email; or
  a message that is to be sent via a real-time messaging application.

11. The computing system of claim 1, further comprising:
  based upon the keyword and the identifier for the user, identifying at least one tenancy of the user;
  for each identified tenancy, walking a computer-implemented tenancy graph, wherein the tenancy graph comprises nodes and edges connecting the nodes, wherein walking the tenancy graph comprises:
    identifying at least one seed node in the tenancy graph, wherein the at least one seed node represents the at least one topic that corresponds to the keyword; and
    identifying at least one second level node in the tenancy graph connected to the at least one seed node via a at least one edge, wherein the at least one second level node represents computer-readable third content of the tenancy; and
  transmitting second contextual data to the content authoring application, wherein the second contextual data is based upon the third content, and further wherein the second contextual data is included in the second content that is presentable by the content authoring application.

12. The computing system of claim 11, wherein the at least one tenancy of the user is identified based upon at least one of the keyword, the identifier for the user, or access control information.

13. The computing system of claim 11, wherein identifiers for users are selected by the user, wherein the users are to view the second content, wherein the access control information is identified based on the selected identifiers for the users, wherein walking the tenancy graph is limited based upon the access control information.

14. The computing system of claim 1, wherein obtaining the contextual data comprises executing an artificial intelligence (AI) algorithm that takes at least a portion of the first content as input, wherein the AI algorithm outputs the contextual data.

15. A method executed by a processor of a computing system, the method comprising:
   obtaining a keyword and an identifier for a user of a content authoring application;
   identifying a user graph based upon the identifier for the user, wherein the user graph is identified from amongst a plurality of computer-implemented user graphs;
   identifying a portion of the user graph corresponding to at least one topic related to the keyword;
   extracting a computer-readable first content from the portion of the user graph;
   obtaining contextual data based upon the first content; and
   transmitting the contextual data to the content authoring application, and wherein the contextual data is included in computer-readable second content that is presentable by the content authoring application.

16. The method of claim 15, further comprising:
   prior to obtaining the keyword and the identifier for the user, obtaining user activity data for the user from a plurality of applications, the plurality of applications including the content authoring application.

17. The method of claim 16, wherein obtaining the contextual data comprises:
   identifying a first candidate contextual data and a second candidate contextual data; and
   ranking the first candidate contextual data and the second candidate contextual data, wherein the ranking is based upon the user activity data;
   prior to transmitting the contextual data to the content authoring application, selecting the contextual data based upon the ranking.

18. The method of claim 15, wherein obtaining the contextual data comprises:
   accessing the first content based upon the identifier for the user data source and the identifier for the first content; and
   processing the first content to generate the contextual data, wherein the contextual data is stored in a contextual data store upon the content being processed.

19. The method of claim 15, wherein obtaining the contextual data comprises executing an artificial intelligence (AI) algorithm that takes at least a portion of the first content as input, wherein the AI algorithm outputs the contextual data.

20. A non-transitory computer-readable storage medium comprising instructions that, when executed by a processor, cause the processor to perform acts comprising:
   obtaining a keyword and an identifier for a user of a content authoring application;
   identifying a user graph based upon the identifier for the user, wherein the user graph is identified from amongst a plurality of computer-implemented user graphs;
   identifying a portion of the user graph corresponding to at least one topic related to the keyword;
   extracting a computer-readable first content from the portion of the user graph;
   obtaining contextual data based upon the first content; and
   transmitting the contextual data to the content authoring application, and wherein the contextual data is included in computer-readable second content that is presentable by the content authoring application.

* * * * *